US010938841B2

(12) United States Patent
Jennings et al.

(10) Patent No.: US 10,938,841 B2
(45) Date of Patent: Mar. 2, 2021

(54) MULTI-GHZ GUARD SENSOR FOR DETECTING PHYSICAL OR ELECTROMAGNETIC INTRUSIONS OF A GUARDED REGION

(71) Applicant: Raytheon Company, Waltham, MA (US)

(72) Inventors: William Jennings, Plano, TX (US); John Hoffman, Fairview, TX (US)

(73) Assignee: Raytheon Company, Waltham, MA (US)

( * ) Notice: Subject to any disclaimer, the term of this patent is extended or adjusted under 35 U.S.C. 154(b) by 292 days.

(21) Appl. No.: 16/166,668

(22) Filed: Oct. 22, 2018

(65) Prior Publication Data

US 2019/0132339 A1 May 2, 2019

Related U.S. Application Data

(60) Provisional application No. 62/580,839, filed on Nov. 2, 2017, provisional application No. 62/590,448, filed on Nov. 24, 2017.

(51) Int. Cl.
| | |
|---|---|
| *H04L 29/06* | (2006.01) |
| *G08B 13/12* | (2006.01) |
| *G06F 21/75* | (2013.01) |
| *G06F 21/00* | (2013.01) |
| *G08B 13/24* | (2006.01) |

(52) U.S. Cl.
CPC .......... *H04L 63/1416* (2013.01); *G06F 21/00* (2013.01); *G06F 21/75* (2013.01); *G08B 13/128* (2013.01); *G08B 13/2494* (2013.01)

(58) Field of Classification Search
USPC ........................................................ 726/23
See application file for complete search history.

(56) References Cited

U.S. PATENT DOCUMENTS

| | | | |
|---|---|---|---|
| 6,438,825 B1 | 8/2002 | Kuhn | |
| 6,957,345 B2 | 10/2005 | Cesana et al. | |
| 7,015,823 B1 * | 3/2006 | Gillen | G08B 13/128 |
| | | | 340/541 |

(Continued)

OTHER PUBLICATIONS

Lan Zhu, "Integrated resources planning in microgrids considering interruptible loads and shiftable loads", J. Mod. Power Syst. Clean Energy (2018) 6(4):802-815 https://doi.org/10.1007/s40565-017-0357-1, pp. 802-815 (Year: 2018).*

*Primary Examiner* — Khalil Naghdali
(74) *Attorney, Agent, or Firm* — Schwegman Lundberg & Woessner, P.A.

(57) ABSTRACT

A guard sensor injects a multi-GHz (multi giga-bit) guard signal along a guard signal transmission path above an observable knee in the amplitude response of the path to define a guarded region and to detect physical or electromagnetic intrusions of that guarded region. At frequencies above the knee, the signal transmission path exhibits increasingly non-linear and even chaotic behavior that improves the overall sensitivity of the sensor and its ability to detect slight changes in the distributed transmission parameters that characterize circuit devices, signal paths and signals. The guarded region may be used to protect a combination of circuit devices, physical connections, interfaces, high and low frequency signal transmission paths and signals.

28 Claims, 13 Drawing Sheets

(56) References Cited

U.S. PATENT DOCUMENTS

| | | |
|---|---|---|
| 7,180,008 B2 | 2/2007 | Heitmann et al. |
| 7,495,554 B2 * | 2/2009 | Heffner .................. G06F 21/87 340/540 |
| 7,723,998 B2 | 5/2010 | Doi |
| 7,791,898 B2 | 9/2010 | Peytavy et al. |
| 7,952,478 B2 | 5/2011 | Bartley et al. |
| 8,240,038 B1 | 8/2012 | Pham et al. |
| 8,332,659 B2 | 12/2012 | Bartley et al. |
| 8,896,086 B1 | 11/2014 | Arora et al. |
| 9,003,559 B2 | 4/2015 | Bartley et al. |
| 9,576,450 B2 | 2/2017 | Salle et al. |
| 9,986,635 B2 | 5/2018 | Neukam |
| 2011/0267190 A1 | 11/2011 | Ellwood et al. |
| 2012/0223403 A1 | 9/2012 | Keller, III et al. |
| 2015/0358337 A1 * | 12/2015 | Keller .................. G06F 21/577 726/23 |
| 2016/0098561 A1 * | 4/2016 | Keller .................. G06F 21/567 726/24 |
| 2016/0259037 A1 | 9/2016 | Molchanov et al. |
| 2017/0288789 A1 | 10/2017 | Dishon et al. |
| 2019/0385057 A1 * | 12/2019 | Litichever ................ G06N 3/08 |

* cited by examiner

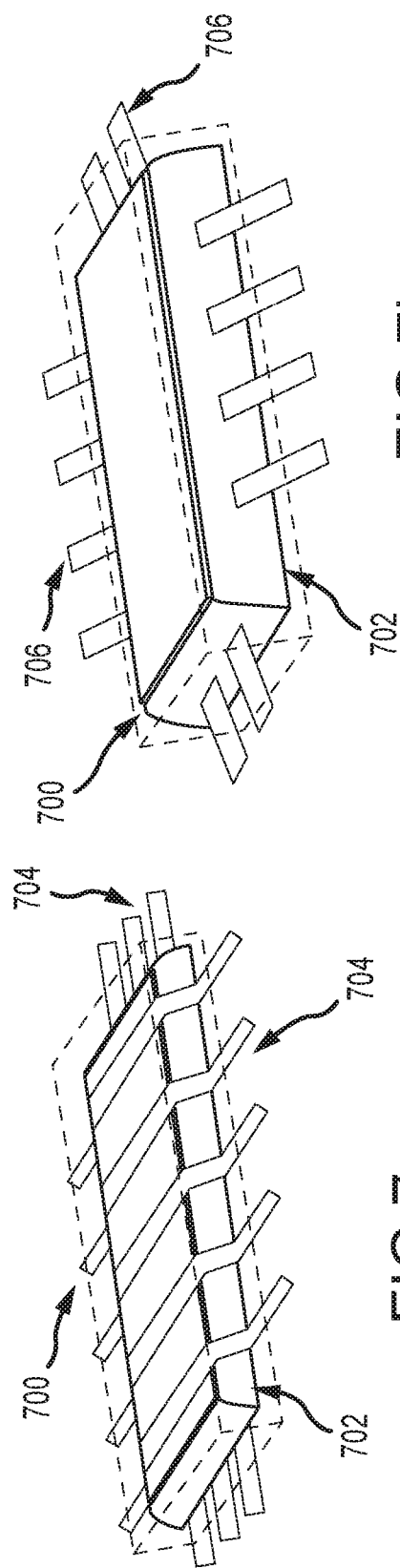
FIG.7a
FIG.7b
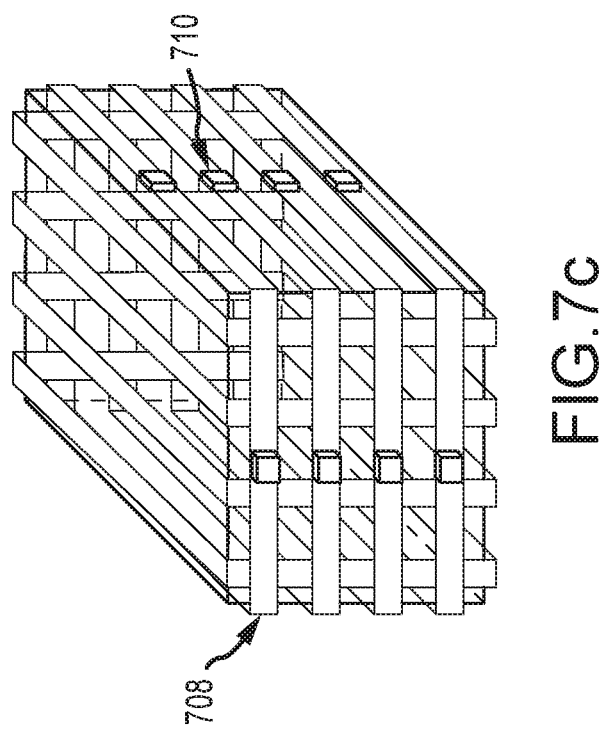
FIG.7c

MULTI-GHZ GUARD SENSOR FOR DETECTING PHYSICAL OR ELECTROMAGNETIC INTRUSIONS OF A GUARDED REGION

CROSS-REFERENCE TO RELATED APPLICATIONS

This application claims benefit of priority under 35 U.S.C. 119(e) to U.S. Provisional Application No. 62/580,839 entitled "Multi-Gigabit/GHZ Environmental Evaluation and Monitoring Sensor" and filed on Nov. 2, 2017 and U.S. Provisional Application No. 62/590,448 entitled "Multi-Gigabit/GHZ Environmental Evaluation and Monitoring Sensor" and filed on Nov. 24, 2017, the entire contents of which are incorporated by reference.

BACKGROUND OF THE INVENTION

Field of the Invention

This invention relates to circuits and methods for sensing physical or electromagnetic (EM) intrusions of guarded regions including one or more objects such as physical structures (circuit devices), physical connections, interfaces, signal paths or signals e.g. electrical (analog or digital), optical, or microwave.

Description of the Related Art

Cybersecurity, computer security or information technology (IT) security is the protection of computer systems from theft of or damage to their hardware, software or electronic data, as well as from disruption or misdirection of the services they provide. Much of the focus to date has been directed to possible remote attacks via the network to access the software or electronic data stored on computer systems. Physical security of the computer systems and hardware has been largely limited to protection by human means (gates, locks, guards).

As these types of security improve, sophisticated adversaries are looking to gain access to attack the computer system hardware directly, either to damage/destroy or modify the hardware or to monitor signal activity, collectively referred to as an "intrusion". An "interface" connects circuitry and signals within a circuit device to external signal paths. A "physical connection" is a connector or other device that physically connects a circuit device on one assembly to a circuit device on another assembly such as via a backplane or cable. A "signal path" is the physical channel (e.g. a metal trace with associated physical path impedances distributed over that path or an optical channel) and a "signal" is the EM signal (e.g. electrical, microwave or optical) transmitted over the physical channel. These interfaces, physical connectors, signal paths and signals are particularly vulnerable to EM or physical intrusion. Intrusions may include adding, replacing or altering devices, circuits, wires, insulators, transmission channel characteristics, modifying physical structures or insertion of probes. Attackers seek to exploit structures, interfaces or interconnections into a system that can be used to gain access to critical signals or the processing devices themselves. Many important systems that directly impact our lives, controlling power grids, financial accounts and transactions, food delivery, transportation systems and infrastructure, communications, legal/medical records, and a vast array of other systems are open to such attacks.

Currently, the only systems that address the problem successfully do so by use of custom secure microprocessor assemblies or devices that do not incorporate interfaces that are susceptible to modification attacks and interfaces that communicate or signal critical information do so with that information protected by combinations of cryptography, counter-reverse engineering design, and physical volume protection. These are special purpose, fixed point designs that are expensive to create and maintain. Most non-military, Commercial-Off-The-Shelf (COTS) processing systems are not designed to address security threats where attackers gain physical access to the system.

One technique to detect physical intrusion is to surround a "guarded region" e.g. a two-dimensional area or three-dimensional volume, with a wire mesh. A physical intrusion that breaks a wire causes a loss of conduction of an applied voltage or current that is detected. For instance, a commercially available product called Gore Wrap (MIL-W-81822/1A) is a dielectric material is a laminate of toughened polyester film and thermosetting adhesive that incorporates a mesh of conductive wires.

U.S. Pat. No. 7,015,823 B1 entitled "Tamper resistant circuit boards" provides a physical barrier for a circuit board that also functions as a tampering sensor or sensors monitored by electrical circuitry that generates a tamper signal for erasing information critical for the operation of the circuit board in the event of sensed tampering attempts to solve similar problems.

U.S. Pat. No. 7,495,554 B2 entitled "Clamshell protective encasement" provides an anti-tamper system that comprises a clamshell protective encasement adapted to encapsulate at least one device on a single circuit board such that at least one electrical connector of the single circuit board is accessible. The anti-tamper system also comprises one or more sensors embedded inside the clamshell protective encasement, the one or more sensors being adapted to detect unauthorized attempts to tamper with the clamshell protective encasement. This patent teaches the concept of creating a physical barrier and then detecting attempts to modify the barrier using sensing properties of that barrier.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides a multi-GHz guard sensor for detecting physical or electromagnetic intrusions into a guarded region that includes one or more objects such as physical structures e.g., circuit devices, physical connectors, interfaces, low or high frequency target signal paths (analog channels or digital links, traces, optical channels, etc.) or low or high frequency target signals e.g. electrical (analog or digital), optical, or microwave. The guard sensor is based on the discovery that an observable performance "knee" frequency exists in the receiver signal phase amplitude response ("amplitude response") of a signal transmission path due to physical imperfections that create a non-uniform distribution of transmission parameters along the path. At frequencies above the knee, the signal transmission path exhibits increasingly non-linear and even chaotic behavior. The guard sensor exploits the non-linear behavior by injecting a multi-GHz guard signal (at least 4 GHz) operating above the knee along a guard signal transmission path and monitoring changes in components of a received guard signal. The distributed complex properties of the path combined with the high frequencies of operation render the guard signals sensitive to any changes and particularly to changes in the physically distributed transmission parameters that characterize the signal transmission path impedance.

For a digitally modulated analog guard signal, intrusions may be detected by monitoring a bit error rate (BER). More sophisticated processing may additionally look at characteristics of the received eye pattern. The guard signal and processing of the guard signal may be configured to improve detection sensitivity, to localize the point of intrusion and/or to characterize the nature of the intrusion.

More generally, the processor may periodically measure physical characteristic data of the one or more guard signal transmission paths, operational data of the one or more guard signal transmission paths including the one or more received guard signals, and environmental data related to at least the one or more guard signal transmission paths and guard signals to generate and update a dynamic fingerprint of the guard circuitry and signals. Changes to this dynamic fingerprint are indicative of intrusions on the guarded region.

Multiple guard sensors may be configured in a 'mesh' to better protect a common guarded region or in a 'network' to provide cooperative protection of multiple separate guarded regions. Information is shared among the guard sensors to improve the level of protection.

The guard signal uses "dynamic fingerprinting" of the guard circuitry itself (e.g. guard circuit devices, paths and signals) to improve overall detection capability. Circuitry including both low and high frequency target signals may be "guarded". High f guard or target circuitry may be "dynamically fingerprinted" and may be both guarded and dynamically fingerprinted.

The guard signal may be multiplexed with a low or high frequency target signal on a common signal transmission path in which the guard signal operates above the knee frequency of that path.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 7a through 7c illustrate different embodiments of guard signal transmission paths for a guarded region that is a three-dimensional volume;

DETAILED DESCRIPTION OF THE INVENTION

Figure 1:
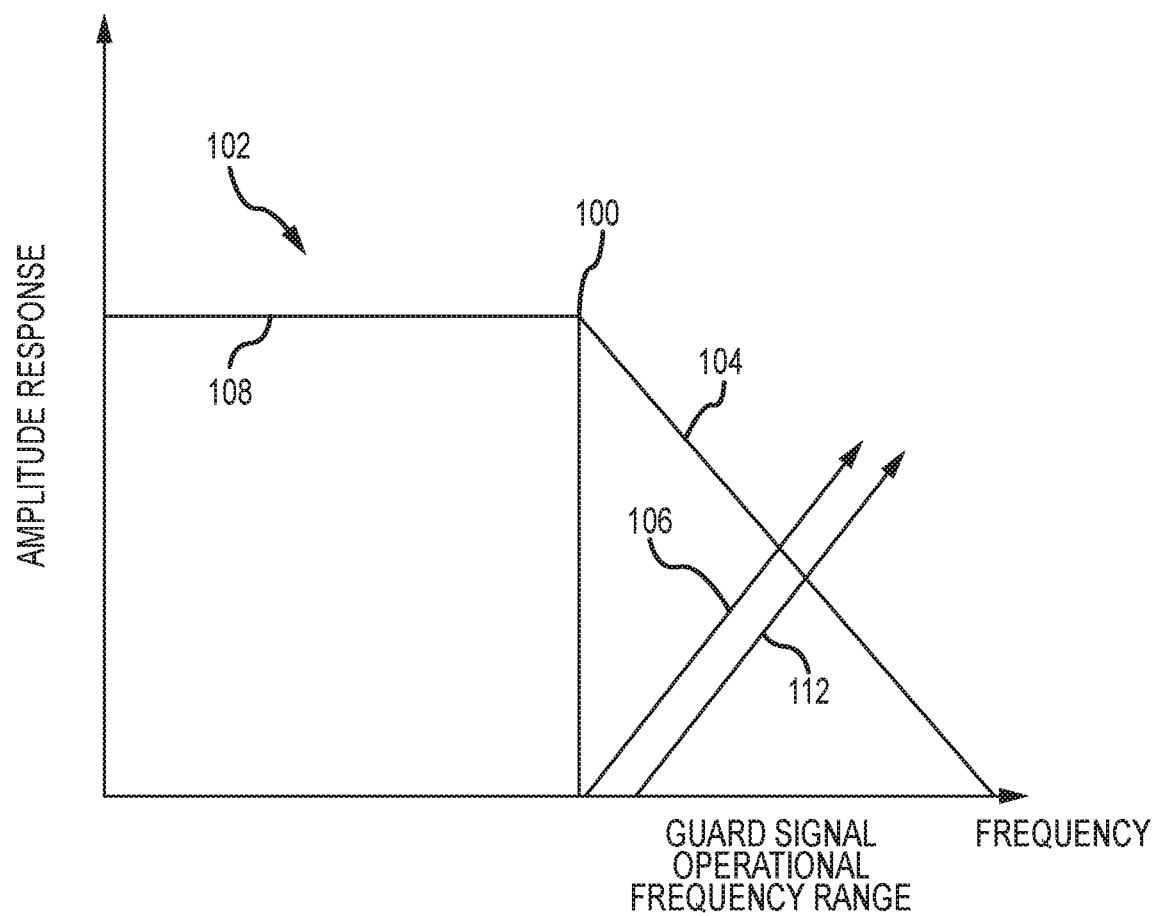
FIG. 1 is a plot of a receiver signal phase amplitude response ("amplitude response") for a guard signal transmission path illustrating the non-linear behavior above a knee frequency.

Increasingly sophisticated attacks that modify, clone, insert attack signals or probe circuit devices, signal paths or signals, may do so with only minimal changes to the lumped parameter characterization (e.g., R, L and C) of the system making detection, localization and characterization of any such attack very difficult using existing techniques.

To detect changes in circuitry such as those caused by physical or EM intrusions that damage, alter or probe the circuitry itself, Raytheon Company developed a system for generating and monitoring a "dynamic fingerprint" of the circuitry. The system periodically measures physical characteristic, operational and environmental data of the circuitry for high-speed data at frequencies above 1 GHz. Changes in the dynamic fingerprint are indicative of changes to the circuitry itself possibly due to an unwanted intrusion. This system is described in co-pending U.S. patent application Ser. No. 15/242,474 entitled "Detection System and Method" filed Aug. 19, 2016, the entire contents of which are incorporated by reference.

Dynamic fingerprinting provides a measure of "self-protection" of the circuitry being monitored. Dynamic fingerprinting is not useful to protect other circuitry and requires certain modifications to the existing circuitry to measure the characteristic, operational and environmental data that may not be allowed or feasible. Furthermore, dynamic fingerprinting has limited usefulness if the circuitry has a low operating frequency e.g., less than 1 GHz due to lack of sensitivity. Even if the operating frequencies are sufficiently high, the composition of the data signals or configuration of the signals paths may not be well tailored to detect, localize or characterize the intrusion.

There is an observable "knee" associated with transmission of signals with sufficiently high frequencies in paths where the actual, as fabricated, individual physical characteristics of the transmission path introduce signal return components that are not only uniquely characterizable to a degree that it is infeasible to exactly reproduce the transmission path without knowledge of specific extracted measures. Below the knee, system response is linear whereas above the knee system response is increasingly non-linear and even chaotic.

Multi-GHz signals used within devices and assemblies, and between assemblies in systems behave as microwave transmission lines with the complications associated with the distributed properties of those lines. At the frequencies of interest and above, the transmission line can no longer be treated as lumped sum values. The distribution and variation of properties along the transmission line contribute to the non-linear behavior and resulting complexity of successful signal transmission and reception. The transmission line must be represented as a function of the series or continuum of changing propagation path point-specific impedance and location and time varying electromagnetic environmental coupling sources. This function becomes more complex and the details more fine grain as frequencies increase, and successful communication of information more difficult and complex at the same time.

Signaling technology frequencies and characteristics are physically constrained by the size and geometries of the path medium. As wiring geometries have generally remain fixed or shrunk, applicable frequencies increase in a corresponding manner, especially enabled by increasing sophistication of signal processing techniques, physical driver/receiver technologies, and sampling technologies.

Commonly at frequencies of interest, adaptive techniques are increasingly required so that transmitting and receiving systems adapt to the individualized characteristics of the specific individual path, increasingly sensitive to minute manufactured material and manufacturing process variations, minute variations of manufactured characteristics of the transmission and receiving circuits, variations in environmental circumstances such as supply voltages, temperature, humidity, and shock and vibration, as well as run time variations in density of information communicated, and other environmental and operational variations in the system that directly impact the operating circuits, variable woven nature of PCB fabrics (fiber weave effect). Certain signaling techniques are more sensitive to the fine grain structure of channel properties in the preferred frequency range of operation.

Characterization of the distributed transmission path characteristics includes conductor losses, dielectric losses, signal leakage, radiation and absorption losses, variations in trace width, variable surface resistance and surface roughness, variations in stubs and geometries, variations in reflection/transmission coefficients and boundaries and pin-to-pin crosstalk.

As shown in FIG. 1, an observable performance "knee" frequency 100 exists in the receiver signal phase amplitude response ("amplitude response") 102 of a signal transmission path due to physical imperfections that create a non-uniform distribution of transmission parameters along the path. At frequencies above the knee in non-linear region 104, the signal transmission path exhibits increasingly non-linear and even chaotic behavior 106. At frequencies below the knee in linear region 108, the signal transmission path exhibits linear behavior. The knee frequency 100 may, for example, be defined as a 3 dB drop from the amplitude response in the linear region 108. Other metrics may be used. Few physical channels maintain a flat amplitude response out past 5 GHz [REF: Reginald Conley, "PCI Express and the PHY(sical) Journey To Gen 3," Electronic Design, May 18, 2009]. As channel specific dispersive factors begin to dominate as frequencies increase, the ability to differentiate subtle distributed effects rapidly increase. Consequently the observed sensitivity above the knee corresponds to the increasing non-linear behavior of signals at increasingly high frequencies.

The use model of the technology for providing a guard sensor to detect EM or physical intrusions, however, is different from normal information transfer. Because of the aforementioned sensitivities, the response of the system (e.g., circuitry, physical connections, interfaces, signal paths and signals) to increasingly significant as-manufactured natural variations along the signal path provides increasingly instance specific differentiation. Furthermore, attempts by the attacker at reproducing or even measuring the same, exact characterization of the increasingly complex physically distributed transmission properties of the channel, using high resolution sensing enabled by high frequency sensing to be accomplished in the same manner rapidly becomes intractable to reproduce or clone given the attacker does not know the specifics of the characterization.

The characterization of the channel occurs by transmission of specific multi-GHz guard signals, guard signal transmission path parameter and configuration selections, performing sampling, alteration of transmission characteristics in adaptive response to channel characteristics, receiver circuit parameter and configuration selections, sampling and measurement techniques performed in specific manners, signal processing, filtering, and statistical analysis techniques performed in the same manner, and information (entropy) extraction in a situationally invariant manner to produce a non-reputable result all taken together make it completely infeasible to reproduce the circuit or moreover successfully attack, alter or probe the circuit in a manner that does not result in a detectable change to the channel response function as measured. The sensitivity 112 to any such intrusions increases with operating frequency above the knee.

This realization led to the idea to add a separate high frequency guard signal path/guard signal to create a "guarded region" that could serve as a physical or EM barrier or sensor to intrusions on objects within the guarded region. At frequencies below the "knee", the guard signal path acts as a "lumped" impedance that can be represented by a single aggregate value (R×L×C) and the behavior is essentially linear thus making subtle or sophisticated intrusions on the sensor difficult to detect. Therefore, the guard signal would operate at multi-GHz frequencies (i.e. >4 GHz) above the knee of the corresponding guard signal path where the signal is highly sensitive to changes in and particularly to changes in the distributed transmission parameters that characterize the signal transmission path impedance due in part to the absolute operating frequency of the guard signal and the non-linear behavior of the guard signal path above the knee. Selection of the guard signal operating frequency would need to balance the benefit of additional sensitivity against the reduced amplitude response, ensuring that there is sufficient received guard signal energy to effectively process. The spatial extent and distribution of received guard signal energy as it flows through the guard signal transmission path must be designed such that intrusions that occur within or sufficiently close to the path are detectable.

Initially these "objects" were envisioned as low f signal paths/target signals. The high frequency guard sensor would provide an effective EM and physical barrier to intrusion. More generally, the objects may be any physical structures, physical connections, interfaces, high or low frequency target signal paths or target signals (e.g., electrical, microwave or optical). The guard signal transmission path may be separate from or shared with the target signal transmission path in which case the guard signal may be transmitted by means of a non-interfering modulation scheme, orthogonally coded, or time share the common path. The guard signal transmission paths may be provisioned in any ad hoc manner in arbitrary configurations including one or more loops, point-to-point connections and may overlay, overlap, protect non-contiguous or separate guarded regions in arbitrary physical configurations.

Detected changes in the sensor signal path impedance and particularly changes in the distributed transmission parameters are a proxy for an EM or physical intrusion into the guard region. To affect the guarding function, recognizable high frequency guard signals are transmitted over guard signal transmission paths and then observed at the receiving end, performing signal processing techniques to discern alterations that occur due to changes along the guard signal transmission paths. The guard sensor may periodically measure physical characteristic data of the one or more guard signal transmission paths, operational data of the one or more guard signal transmission paths including the one or more received guard signals, and environmental data related to at least the one or more guard signal transmission paths and guard signals to generate and update a dynamic fingerprint of the guard circuitry and signals (as opposed to the target circuitry and signals). Changes to this dynamic fingerprint are indicative of intrusions on the guarded region.

For a digitally modulated analog guard signal, intrusions may be detected by monitoring BER. More sophisticated processing may additionally look at parameters of the received eye pattern. The guard signal and processing of the guard signal may be configured to improve detection sensitivity, to localize the point of intrusion and/or to characterize the nature of the intrusion. Multiple guard sensors may be configured in a "mesh" to better protect a common guarded region or in a "network" to provide cooperative protection of multiple separate guarded regions. Information is shared among the guard sensors to improve the level of protection. The "guard signal" may be used in conjunction with "dynamic fingerprinting" of the target circuitry itself to improve the overall detection capability.

Unlike dynamic fingerprinting of the existing circuitry described in the previous patent filings, the guard sensor is not being used for "self-protection" primarily, although still requires that, but is instead configured to protect other circuit devices, signal transmission paths and signals within the "guarded region". The circuitry required to generate, transmit, receive and process the guard signal can be implemented around existing circuitry without requiring modifications to that circuitry. The guard signal transmission paths may be designed and routed to optimize the guarding function. The multi-GHz (or multi-Gigabit) guard signal provides exceptional sensitivity regardless of the operating frequency of the target signal and may be composed to improve detection sensitivity, localize the intrusion or characterize the intrusion.

The guard sensor uses the extreme sensitivity of such multi-GHz or Gigabit paths (electrical, microwave, optical) to changes in signal impedance along the transmission path. Changes in path impedance not only introduce frequency dependent signal attenuation terms but also frequency and phase dependent reflection and transmission terms for each point along that path where there is a change in impendence. The very high speeds that these paths run at makes them very sensitive to changes in impedance resulting in rapid degradation of the ability to perform signaling along the path. This is important because modifications to a system, assembly, or device that introduce additional metal, damage or alter the sensor signal transmission path, introduce capacitive or inductive loads, or actively significantly alter the electromagnetic signal background can easily be detected, and the technique only improves as future data rates increase.

Not only is the impedance a function of the signal path physical characteristics, but also a function of nearby conductive structures due to capacitive coupling and inductance. As the data rate increases, the complexity of the distributed impedance increases resulting in frequency dependent distortions and attenuations that change as the impedance changes along the path of the signal. Moreover, changes in the electromagnetic impedance that occur along the path result in frequency dependent partial reflection, transmission, and absorption signal components. These high-speed signals are highly sensitive to the distributed transmission line electromagnetic impedance of the signal conductor path and other nearby signals and other metal structures.

Because the analog characteristics of multi-GHz guard signals are used for precise analysis and characterization, it is not essential that the transmitted guard signal be digital, however it is both convenient and efficient to use existing digital transmission link technology in order to leverage the extensive capabilities for monitoring and characterizing of the links in addition to adaptive signaling techniques that can compensate for temperature or supply voltage variances. In one example embodiment, the guard signal transmission path is a high-speed point-to-point serial data link and the transceivers are serial serializer/deserializer (SerDes) (e.g., multi-gigabit transceivers) utilizing differential signaling to transmit and receive serial data. The circuitry thus comprises at least two entities communicating over a high-speed SerDes communication link.

Automated testing software can be used to monitor an interface during operation. For example, the automated testing may involve adjusting (e.g., deliberately adjusting) link settings (e.g., by the automated test software) and monitoring the movement and associated response time of an eye pattern associated with the link. For instance, a transmitted digital signal may be periodically measured (e.g., repetitively sampled) at a high rate compared to the bit rate of the transmitted digitally encoded signal. The sample data may be used to evaluate the time sequence characterization of bit-time period transmission line transitions associated with the periods where the digital signal transitions from high to low and low to high. Each sample set may be partitioned (e.g., using the bit clock) into segments representing either a logic high or low valued for that digital signal. Each segment contains those time periods where the corresponding analog signal may be changing from low to high. Superimposing the resulting bit patterns and centering around the middle of the transmitted bit clock time results in an eye pattern. The centroid for that eye then represents the optimum point in time for the receiving device to sample the value of the transmitted digital signal with the lowest probability for a detector bit error.

Figure 2A:
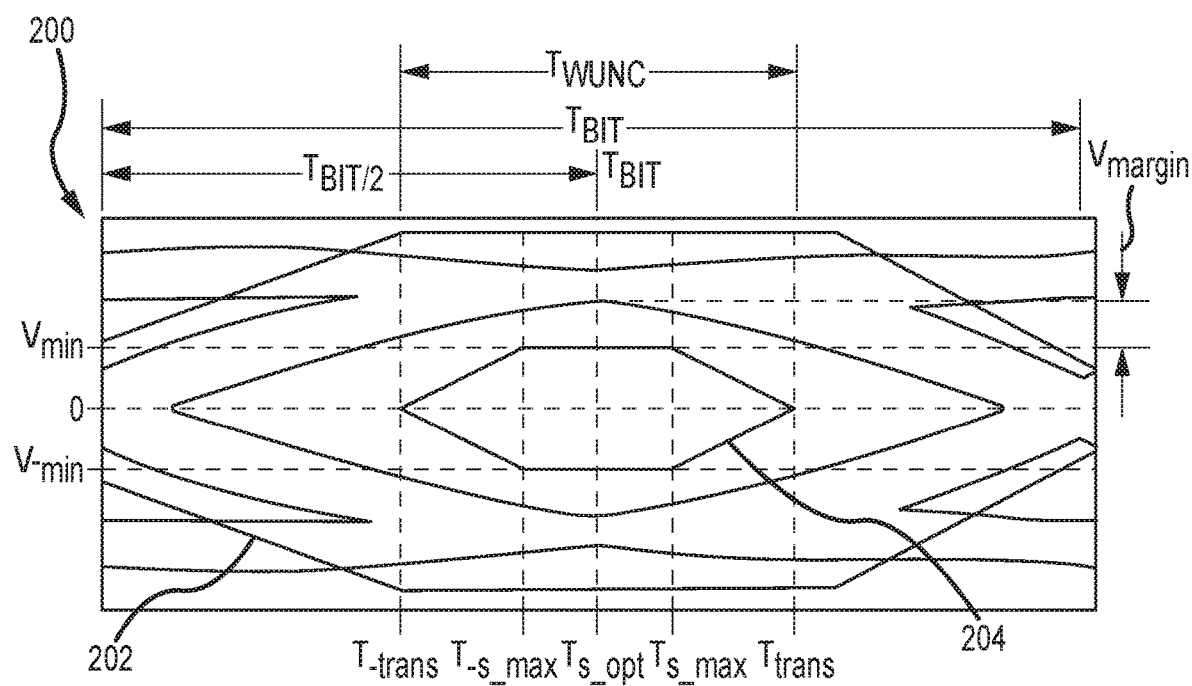
FIGS. 2a through 2c illustrate an example of an "eye" pattern for a multi-GHz digital guard signal and changes to the eye pattern at guard signal frequencies below and above the knee frequency in response to an intrusion.

FIG. 2a shows a diagram of an eye pattern 200 for a transceiver. For detection without bit errors, eye pattern 200 must lie between maximum and minimum specified eye patterns 202 and 204, respectively, for correct behavior exhibiting a sufficient eye pattern signal margin. These eye patterns are characterized by several analog parameters including:

$V_{min}$=Minimum Specified Voltage
$V_{margin}$=Voltage Difference from Sample Value and $V_{min}$
$T_{BIT}$=Bit Transmission Bit Time
$T_{s\_opt}$=Optimum Sampling Time
$T_{s\_max}$=Maximum time from Optimum $T_{trans}$=Minimum time before transition
$T_{WUNC}$=Maximum Time Window of Uncertainty for Sampling Captured eye patterns represent actual circuit behavior at the time when captured. The height of the center of the eye represents the difference between high and low at the time of the receiver sampling clock. The width of the eye at the mid-voltage value represents the allowable bit sample time uncertainty. A more "open" eye indicates minimal signal distortion while a more "closed" eye indicates signal distortion due to interference and noise. The difference in the degree to which the eye is "open" or "closed" versus specified minimum and maximum constraints indicates the operation margin versus the specifications.

Characteristics such as the height of the eye, leading and falling edges, the width of the eye, and horizontal collapse (or narrowing) of the eye may be noted and compared to identify deviations in performance. Precisely characterizing the eye pattern associated with the original interface, and monitoring deviations from that characterization, provides the ability to detect performance fluctuations. Once characterized, characteristics of the eye pattern that are due to the physical impedance of the transmission channel cannot change unless there is a physical change in the channel.

According to an aspect of an embodiment of the present invention, detection of these fluctuations can indicate intrusions of the guarded region. Intrusions may be detected by monitoring a bit error rate (BER). More sophisticated processing may additionally look at analog parameters of the received eye pattern. The guard signal, guard signal transmission path and processing of the guard signal may be configured to improve detection sensitivity, to localize the point of intrusion and/or to characterize the nature of the intrusion.

Figure 2B:
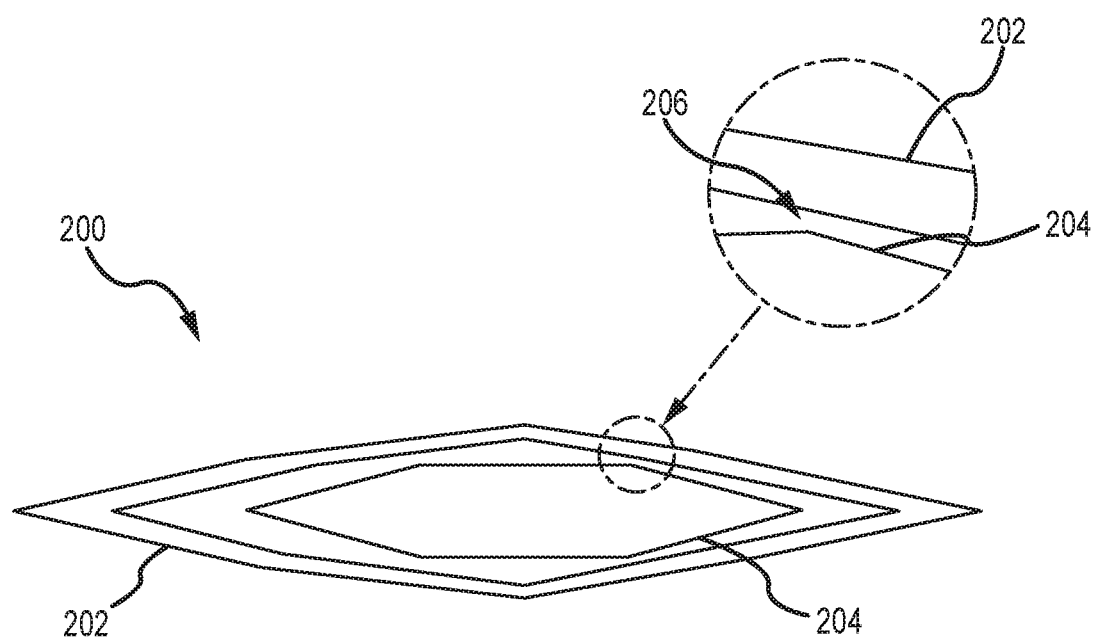
Figure 2C:
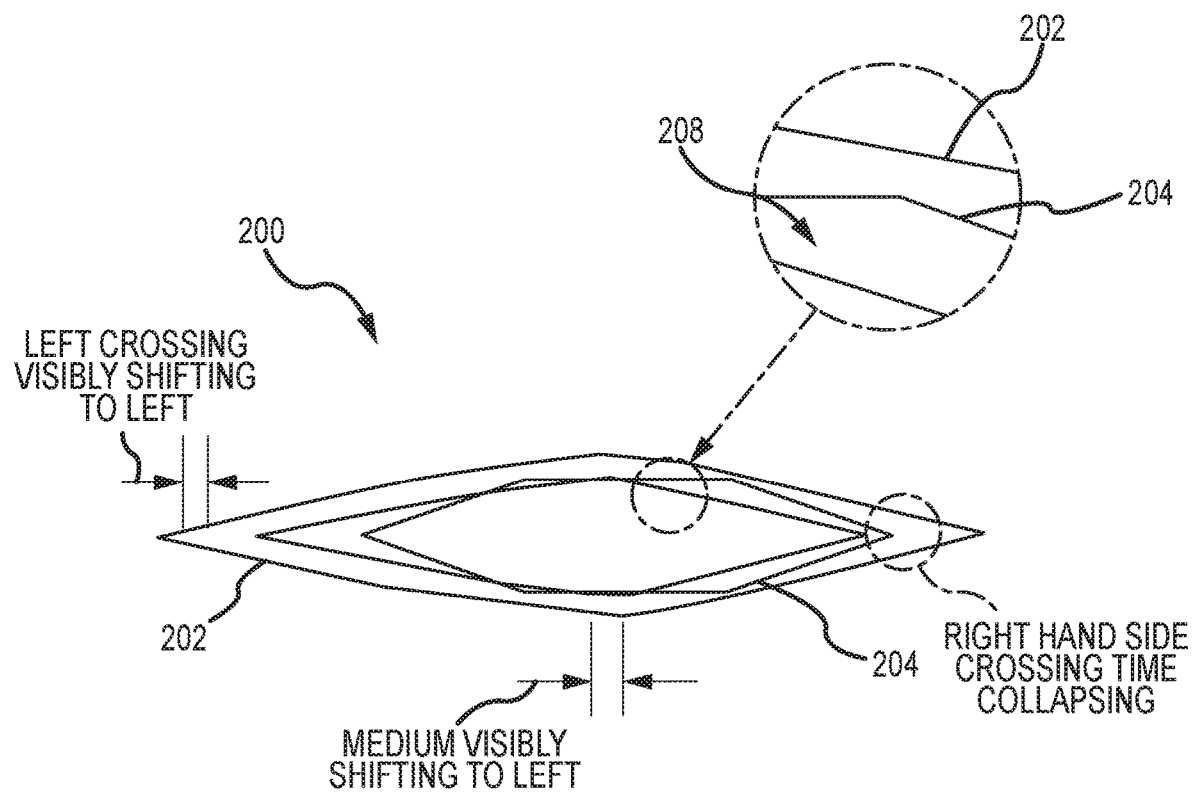

The significance of the guard signal operating frequency is illustrated in FIGS. 2b and 2c. In this example, the guard signal transmission path (i.e., the serial link) exhibits knee at approximately 4.5 GHz. To simulate an intrusion such as the insertion of a probe into the guarded area, a 3.5 pf load is coupled to the serial link. A guard signal operating at 4.0 GHz does not detect the intrusion. As shown in FIG. 2b, there is sufficient eye pattern signal margin 206 between the maximum and minimum specified eye patterns 202 and 204 for correct behavior so that the BER is very low within the margin of a nominal BER for the serial link under the given transmission environment. A guard signal operating at 5.0 GHz does detect the intrusion. As shown in FIG. 2c, there is a negative eye pattern signal margin 208 which results in detected bit errors and a BER outside the margin of a nominal BER for the serial link under the given transmission environment. The ability to detect the intrusion is due in part to the higher absolute operating frequency and in part to the non-linear behavior of the guard serial link above the knee. Both are necessary to detect, locate and characterize subtle and sophisticated intrusions of a guarded region.

Figure 3:
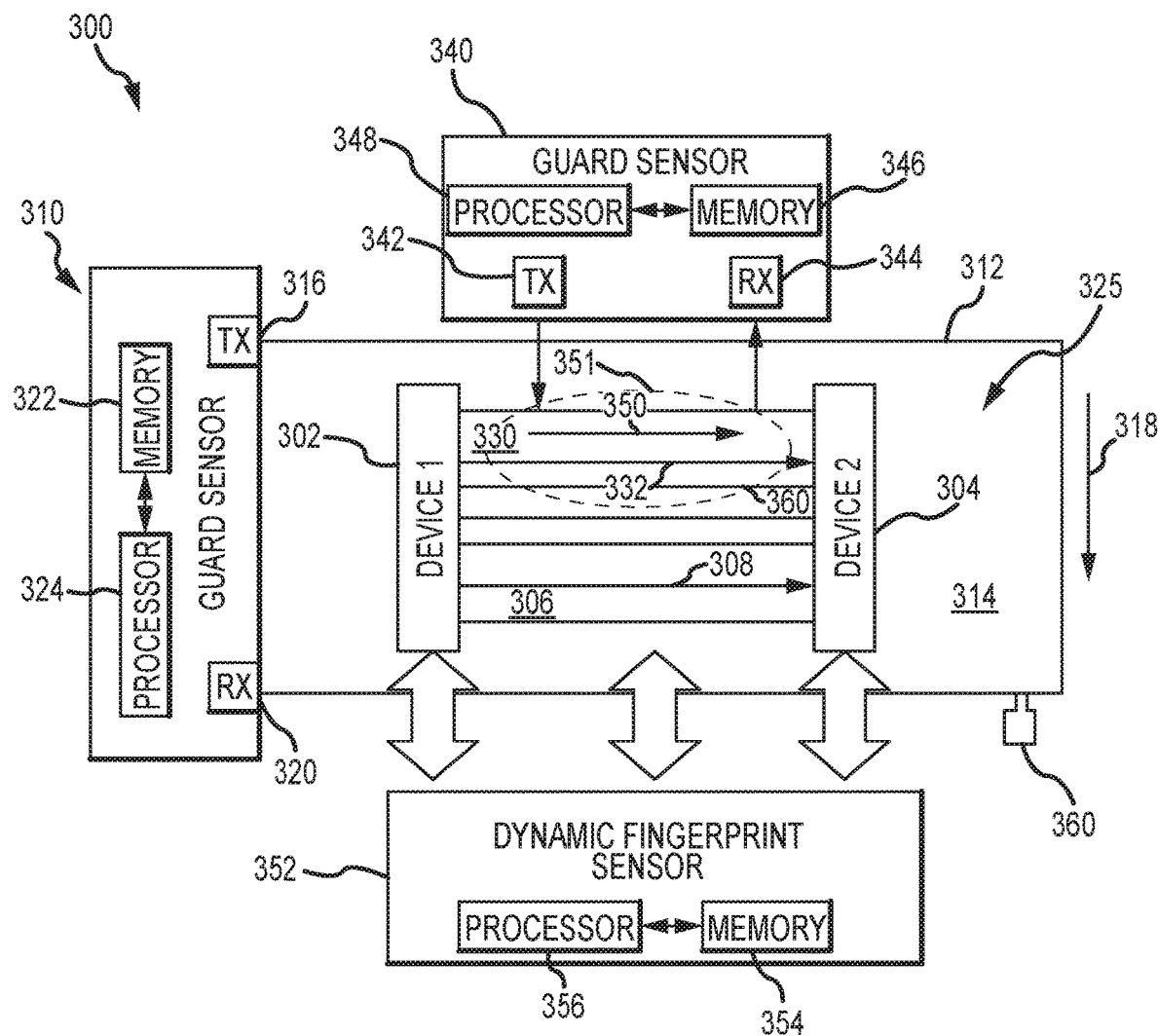
FIG. 3 is a simplified schematic diagram of an exemplary guard sensor for providing both an electromagnetic (EM) and physical barrier to intrusion of a guarded region.

Referring now to FIG. 3, an embodiment of a Multi-GHz guard sensor 300 comprises multiple different guard configurations that can be implemented alone or in combination to detect EM or physical intrusions of a guarded region.

A guard sensor 310 includes a guard signal transmission path 312 that defines a guarded region 314. A transmitter (Tx) 316 is configured to transmit one or more guard signals 318 at frequencies Y above the knee frequency and at least 4 GHz over the guard signal transmission path 312. A receiver (Rx) 320 is configured to receive components of received guard signals 318 from the guard signal transmission path 312. A memory 322, wherein the memory has stored thereon instructions that, when executed by a processor 324, cause the processor 324 to generate and transmit the one or more guard signals 318 over the guard signal transmission path 312, measure the components of one or more received guard signals and compare the one or more components of the received guard signals to one or more previously received guard signals to detect changes in physically distributed transmission parameters of the one or more guard signal transmission paths or one or more guard signals at frequencies above the knee frequency and at least 4 GHz as a proxy for EM and physical intrusions 325 on the guarded region 314.

In an embodiment, the target circuitry (e.g., the circuitry to be guarded within guarded region 314) includes Device 1 302 and Device 2 304 connected by a low frequency target signal transmission path 306 on which a low frequency target signal 308 is transmitted from Device 1 302 to Device 2 304. Guard sensor 310 can provide all of the advantages of a high frequency guard to the low frequency target circuitry including the design and routing of the guard signal transmission path 312 to define the guarded region 314 and selection of a high frequency operating frequency that benefits from the enhanced sensitivity provided by being above the "knee" of the guard signal transmission path 312. In certain embodiments, the ratio of the guard signal frequencies Y to the target signal operating frequencies X is at least 5:1. The guard sensor may be implemented "around" the target circuitry without requiring any modifications to the target circuitry. This approach can be used to protect low frequency target circuitry such as microprocessor test, configuration, and security interfaces including IEEE 1149.1 JTAG, Industry standard Phillips Inter-Integrated Circuit Bus (I2C-bus), Intel Platform Environment Control Interface (PECI), Intel Trusted Platform Module (TPM) Interface, and emerging standards such as IEEE P1838—Standard for Test Access Architecture for Three-Dimensional Stacked Integrated Circuits (draft) as well as discrete microprocessor device control signals such as reset and interrupt pins.

In another embodiment, the target circuitry further includes a high frequency target signal transmission path 330 on which a high frequency target signal 332 is transmitted between Device 1 302 and Device 2 304. There are multiple options for guarding this additional high frequency path. First, it may be guarded by guard sensor 310 as part of guarded region 314. Second, another guard sensor 340 including Tx 342, Rx 344, memory 346 and processor 348 may be configured to inject and multiplex a different high frequency guard signal 350 onto the high frequency target signal transmission path 330 defining a guarded region 351 and measure components of the received guard signal. Unlike high frequency target signal 332, the guard signal 350 can be specifically selected to improve detection sensitivity, localize the intrusion or characterize the intrusion. Third, a dynamic fingerprint sensor 352 including a memory 354 and processor 356 of the type described in the previous filings may be configured to measure target circuitry, operational and environmental data to generate a dynamic fingerprint for the high frequency portion of the target circuitry. These "hybrid" configurations provide additional sensitivity and protection of the guarded regions.

The dynamic fingerprint generated for the target circuitry itself or for the guard circuitry may be generated by periodically measure physical characteristic data of the target/guard circuitry, operational data for the target/guard circuitry, and environmental data, periodically capturing the measured data, generating a dynamic fingerprint based on an aggregation of a first set of the captured data, wherein the dynamic fingerprint is a compound data structure encapsulating the aggregated data, associating metadata with the dynamic fingerprint, periodically update the dynamic fingerprint according to successive sets of the captured data and comparing the updated dynamic fingerprint to a previous dynamic fingerprint, to detect the changes in the dynamic fingerprint as a proxy for EM and physical intrusions either on the target circuitry itself or on the guarded region. The critical differences being that in one case the dynamic fingerprint provides a measure of self-protection of the target circuitry being fingerprinted and in another case the dynamic fingerprint of the guard circuitry provides a measure of protection for something else, that something being the target circuitry.

In another embodiment, the target circuit includes only the high frequency target transmission path 330 on which a high frequency target signal 332 is transmitted between Device 1 302 and Device 2 304 (no low frequency path 306). In this case, guard sensor 310 may protect the target circuitry within guarded region 314 and/or guard sensor 340 may protect the high frequency target signal transmission path 330 within guarded region 351. These approaches may be used for high frequency target circuitry such as found in emerging and future industry standard Multi-Gigabit transmission standards for 10Gbit-Ethernet/10000BT, 8GB Fibre Channel, PCI-Express, XAUI, SATA, and others.

In another embodiment, Devices 1 and 2 302 and 304 are joined by a physical connection 360 (e.g. connectors that interconnected via a cable or backplane). Intrusions on the guarded region 314 may be used as a proxy for physical intrusions on physical coaction 360. Alternately, a guard sensor may route a guard signal transmission path (not shown) along the physical connection 360 to define a guarded region limited to that connection such that any physical intrusion (e.g., disconnection or alteration) is detected as an intrusion.

In another embodiment, guard sensor signal transmission paths can be designed in such a manner that they can function as antenna structures 360 to be more sensitive to detect attack signals or to assert guard signal energy into an adjacent region.

Figure 4:
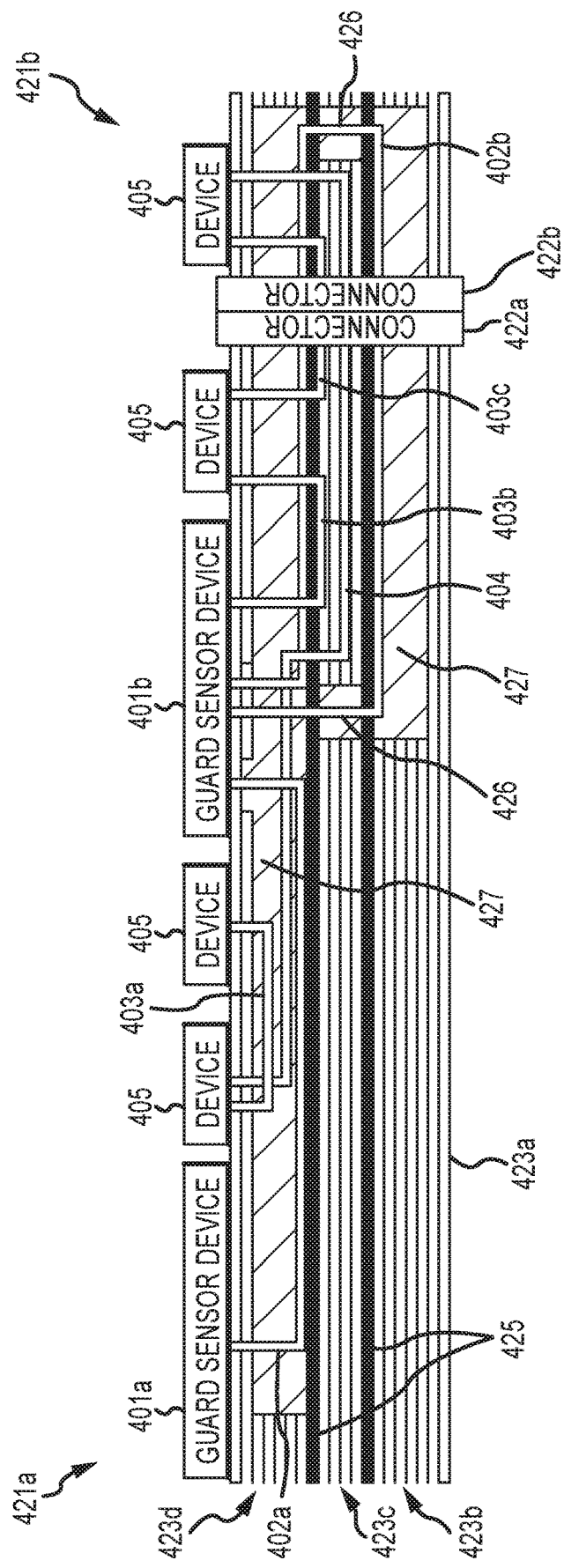
FIG. 4 illustrates a printed circuit board (PCB) embodiment of a multi-gigabit SERDES guard sensor for providing both an electromagnetic (EM) and physical barrier to intrusion of a guarded region including low frequency circuitry and target signal transmission paths.

Referring now to FIG. 4, multiple guard sensors are implemented in an embodiment of a two-side multi-layer printed circuit board (PCB) configuration to establish guarded regions to protect both low frequency and high frequency target signal transmission lines from EM and physical intrusions. The figure notionally depicts two multilayer PCBs 421A and 421B connected by card connectors 422A and 422B that incorporate the guard sensors as well as the guarded signals. Each PCB 421A and 421B includes multiple layers 423A, 423B, . . . Two power planes 425 are shown. Ideally target signals (low frequency 403A, 403B and 403C and high frequency 404 used herein to designate both the target signal and path) would be routed in the middle layers of the board stack-up in order to maximize difficulty for an attacker to successfully modify the assembly without damage. Shown in the figure, guard sensor devices 401A and 401B transmit guard signals over guard sensor transmission paths 402A and 402B. Both high frequency guard signals are routed near power/ground planes 425 both for signal integrity purposes as well as to shield signals from potential cross-talk. Depicted on the right, the guard sensor transmission path 402B is routed in a loop-back manner, transmitted by guard sensor device 401B routed from multilayer PCB 421A, through card connectors 422A and 422B, to PCB 421B. The guard signal then transitions between layers by via connection 426 and is then routed back to PCB 421A on the opposite layer. In this manner the outgoing and return paths for guard signal transmission path 402B are depicted on layers above and below power planes 425 that then encapsulate low frequency target signal 403B and high frequency target signal 404 transmitted between communicating devices 405. These target signals are sandwiched in the layers between power/ground planes 425. In this manner, the target signals 403A, B and C and 404 are shielded from interference from the guard signal while being guarded from above and below.

Importantly, depicted in the figure, the guard region associated with the sensor guard signal paths 402A and 402B includes those transmission paths and also the surrounding guarded region 427 where physical electromagnetic compositional characteristics impact the characteristics of the transmitted sensor guard signals. The horizontal span of the surrounding guarded region 427 is designed to extend so that attempts to bypass by means of a diagonal drill are not possible without penetrating that region.

Depicted on the left side of the figure, low frequency target signal 403A and high frequency target signal 404 are routed directly within the guarded region 427 rather than on the opposite side of the power/ground plan 425. While the design needs to consider interference between these signals, being directly in the guarded region 427 they are being guarded by the sensor. Had they been located on the opposite side of the power/ground plane, even deeply buried, they could have been subject to attack from the bottom side of the assembly.

Finally, low frequency target signal 403C depicts the case where the target signal connects the guard sensor device 401B to a communicating device 405. In this case the low frequency target signal 403C could be controlled and behavior monitored by means of normal low frequency signaling means while additionally guarded by the sensor guard signal transmission path 402B. An example of where this is important to do is where the JTAG interface on a microprocessor, if reached by an attacker can completely compromise the security of the device. Disconnecting that JTAG interface from the general assembly scan chain and then routing it to a sensor device where it can be controlled and monitored, when also protected by the sensor guard transmission path 402B eliminates that means of attacking that device.

Figure 5A:
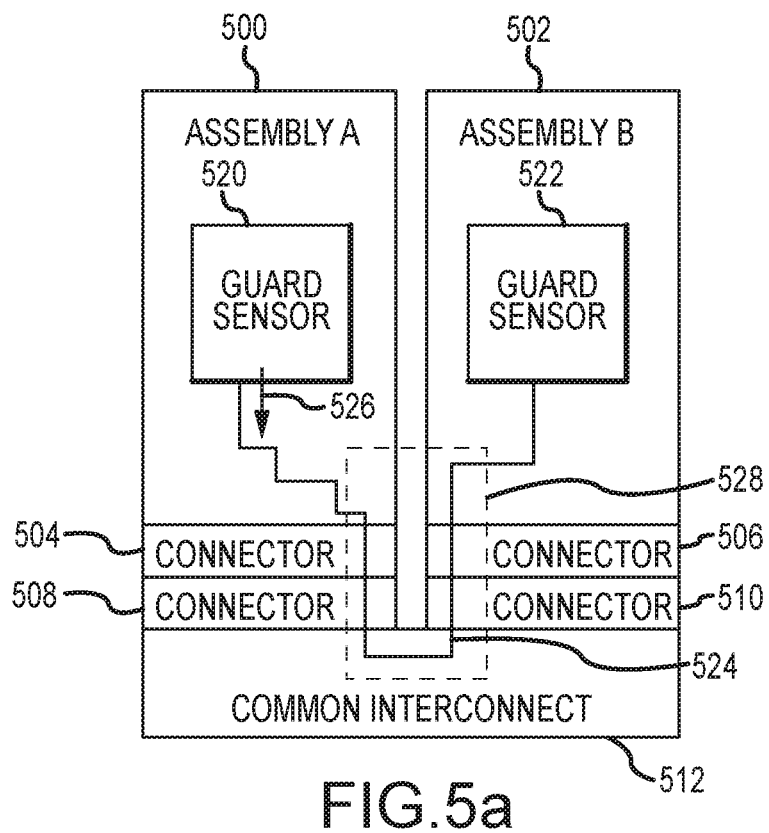
FIGS. 5a through 5b illustrate different embodiments of a guard sensor for ensuring physical continuity between assemblies.
Figure 5B:
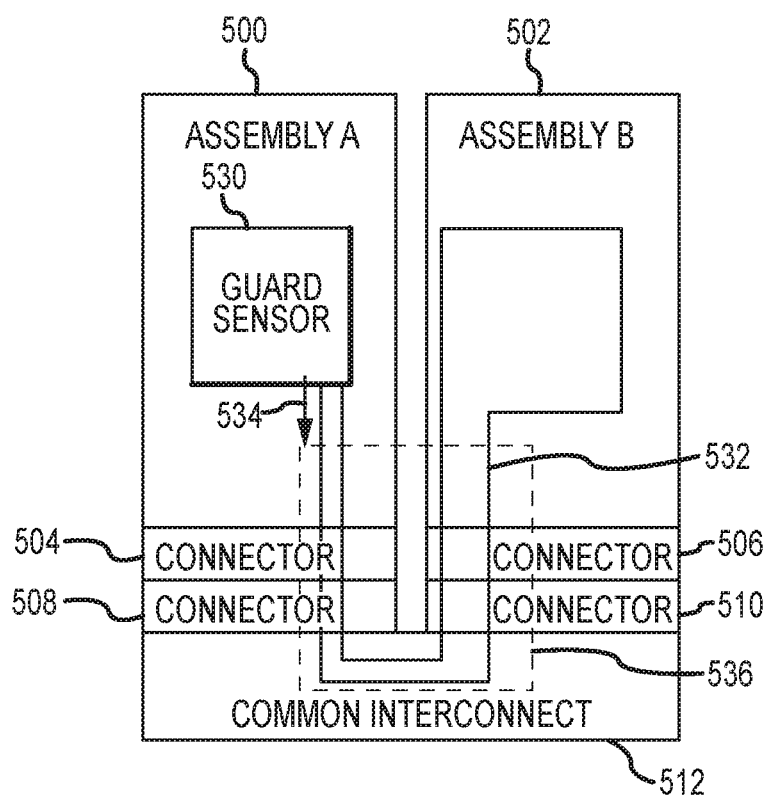

Referring now to FIGS. 5a and 5b, the guard sensor may be configured to provide a guarded region to detect EM or physical intrusions on the physical connectivity and continuity between assemblies (e.g., a PCB including circuit devices, signal paths and signals some of which are communicated between the assemblies). A base configuration may include Assemblies A 500 and B 502 each having a physical connector 504 and 506, that are connected to mating connectors 508 and 510, that are physically and electrically coupled to a common interconnect 512 such as a chassis signal backplane or a cable. Electrical signals are pass through the connectors and common interconnect between the assemblies.

As shown in FIG. 5a, in one embodiment guard sensors 520 and 522 are positioned on assemblies A and B 500 and 502, respectively. A guard signal transmission path 524 is embedded and routed through the physical structure of the combined assemblies; through the mated physical connectors 504 and 506 and through the common interconnect 512. At least one high frequency guard signal 526 is transmitted from one guard sensor 520 to the other 522. The guard signal transmission path 524 and high frequency guard signal 526 together define a guarded region 528 that is specifically tailored and limited to protect the physical connectivity and continuity of the combined assemblies.

As shown in FIG. 5b, in another embodiment a guard sensor 530 is positioned on Assembly A 500. A guard signal transmission path 532 is embedded and routed through the physical structure of the combined assembly and forms a loop so that it both originates and terminates at the guard sensor 530. At least one high frequency guard signal 534 is transmitted around the loop. The path 532 and the signal 534 together defining a guarded region 536 that encompasses the different physical connections.

Figure 6A:
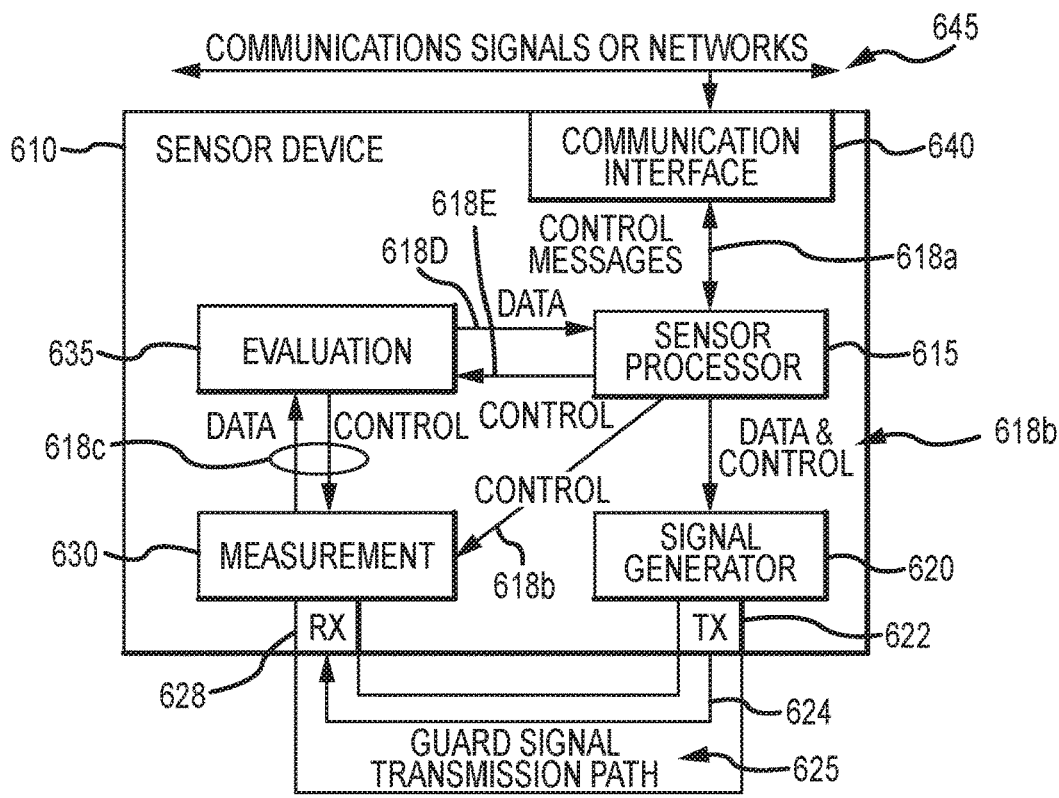
FIGS. 6a and 6b illustrate different embodiments in which the guard sensor transmitter and receiver are co-located on a common circuit device and are located on different circuit devices.
Figure 6B:
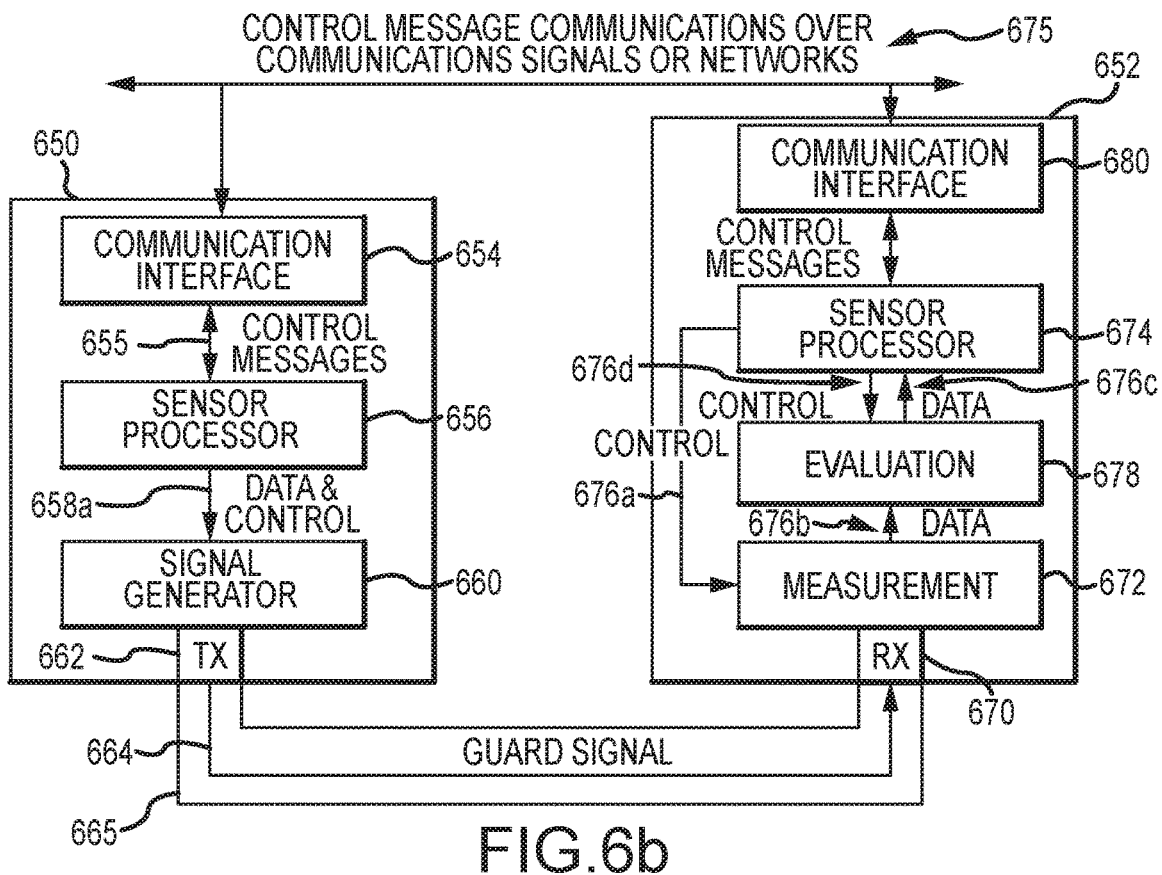

Referring now to FIGS. 6a and 6b, the guard sensor may be configured with the Transmitter (Tx) and Receiver (Rx) co-located on the same sensor device or located on different sensor devices. The signal generation, measurement and processing functions are essentially the same, they are just either performed on a single device or a pair of devices. There are tradeoffs when attempting to route the guard signal transmission paths. Routing guard sensor signal transmission paths between devices has the advantage of potentially easier routing choices and enabling easier provisioning of sensor resources. However, in cases with a single stand-alone device, a loopback configuration is necessary. A design could use combinations of either or both as appropriate.

As shown in FIG. 6a, in a guard sensor device 610 sensor operations are controlled and orchestrated by a sensor processor 615 that provides control and data messages 618A to control a guard sensor signal generator 620, selecting transmitted guard signal waveforms, guard signal waveform timing, guard signal transmission parameters, and (as applicable), guard signal data contents. The guard sensor signal generator 620, in turn, generates the signal for transmission, which is then provided to a transmitter (Tx) 622 responsible for transmitting the signal into a guard sensor signal transmission path 624 to create a guarded region 625.

This guard signal loops back to the same guard sensor device 610 where components of the guard signal as influenced by the distributed physical transmission properties of the guard signal transmission path 624 and any intrusions are received by a receiver (Rx) 628, and measured 630 such as by a data sampler. The measurement circuit 630 is controlled by the sensor processor 615 setting receiver and measurement controls 618B in conjunction with the transmitted signal. Measured data 618C is provided to an evaluation circuit 635 that may alter measurement parameters and controls 618B based on observed results.

This evaluation circuit 635 in turn provides result data 618D to and receives tasking controls 618E from the sensor processor 615 that is responsible for comparing results to some established security policy in the event that detected results are determined to be outside of acceptable bounds. The sensor processor 615 is responsible for initiating actions based on observations including sending alarms or notifications to other cooperating devices via some communications interface 640 via communications signals or networks 645.

By contrast in FIG. 6b, the guard signal is transmitted between cooperating guard sensor devices 650 (guard signal generation and transmission) and 652 (guard signal reception and evaluation) that together form the guard sensor. Guard sensor device 650 includes a communications interface 654 for receiving control message communications from guard sensor device 652 over communications signals or networks 675 and forwards the control messages 655 to a sensor processor 656 that provides control and message data 658A to control a guard sensor signal generator 660 that selects transmitted guard signal waveforms, guard signal waveform timing, guard signal transmission parameters, and (as applicable), guard signal data contents. The guard sensor signal generator 660, in turn, generates the signal for transmission, which is provided to a transmitter (Tx) 662 responsible for transmitting the signal into a guard sensor signal transmission path 664 to create a guarded region 665.

The guard signal is routed to guard sensor device 652 where components of the guard signal as influenced by the distributed physical transmission properties of the guard signal transmission path 664 and any intrusions are received by a receiver (Rx) 670, and measured 672 such as by a data sampler. The measurement circuit 672 is controlled by a sensor processor 674 that sets receiver and measurement controls 676A in conjunction with the transmitted signal. Measured data 676B is provided to an evaluation circuit 678 that may alter measurement parameters and controls based on observed results.

This evaluation circuit 678 in turn provides result data 676C to and receives tasking controls 676D from the sensor processor 674 that is responsible for comparing results to some established security policy in the event that detected results are determined to be outside of acceptable bounds. The sensor processor 674 is responsible for initiating actions based on observations including sending control messages via communications interface 680 to sensor device 650 in order to revise the transmitted signal waveforms or transmission parameters. The two devices 650 and 652 exchange messages cooperatively to jointly perform the sensor function. Furthermore sensor processor 674 is additionally responsible for sending security alarms or notifications to other cooperating devices via communications signals or networks 675.

Referring now to FIGS. 7a through 7c, the "guarded region" is a "three-dimensional volume" 700 that encompasses guarded objects 702. As shown in FIG. 7a, guard signal transmission paths 704 are routed over and under the guarded objects 702 to define the three-dimensional volume 700. As show in FIG. 7b, guard signal transmission paths 706 are routed through the guarded objects 702. Note, the guarded region extends some distance away from the guard signal transmission paths 706 to define the three-dimensional volume 700 around the guarded objects 702. As shown in FIG. 7c, guard signal transmission paths 708 are routed over, under and around the guarded objects to define the three-dimensional volume. Guard sensors 710 around the volume transmit, measure and process the high frequency guard signals. In other embodiments, the guard signal transmission paths may be routed over, under, around and/or through the guarded objects in various configurations to define guarded regions specifically tailored to the target circuitry (objects) to be guarded and the nature of the threat of intrusion.

Figure 8A:
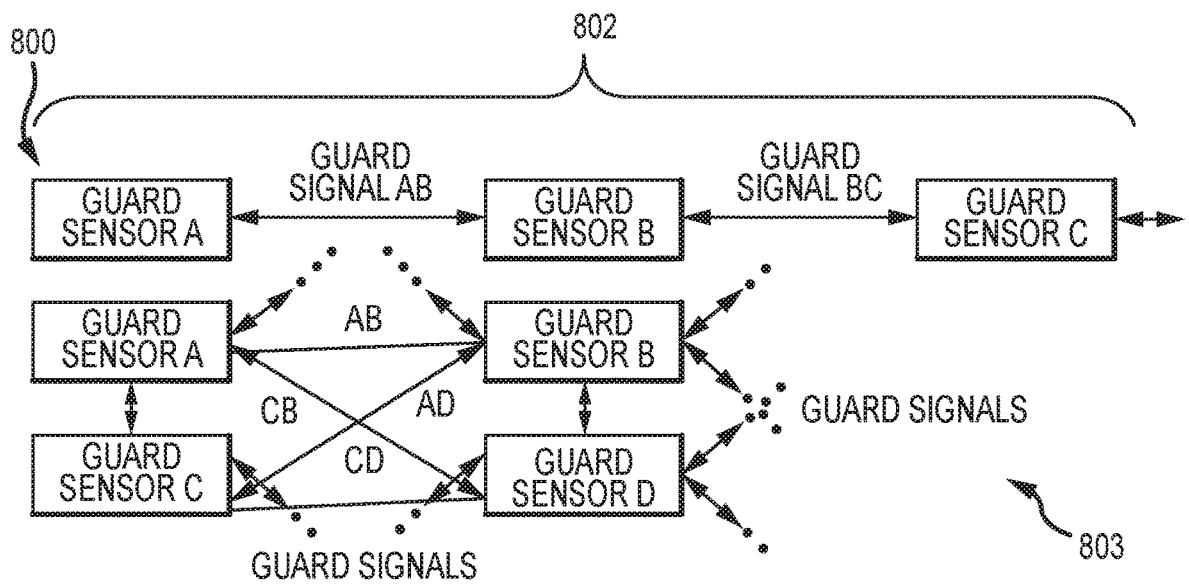
FIGS. 8a through 8c illustrate different configurations of a network of sensors for an arbitrary configuration of one or more guarded regions, for cooperative protection of a common guarded region, and separate guarded regions.
Figure 8B:
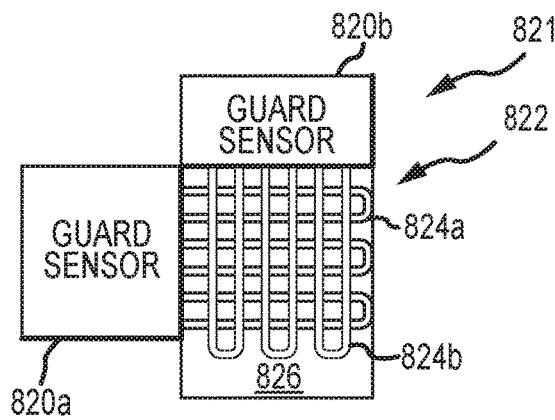
Figure 8C:
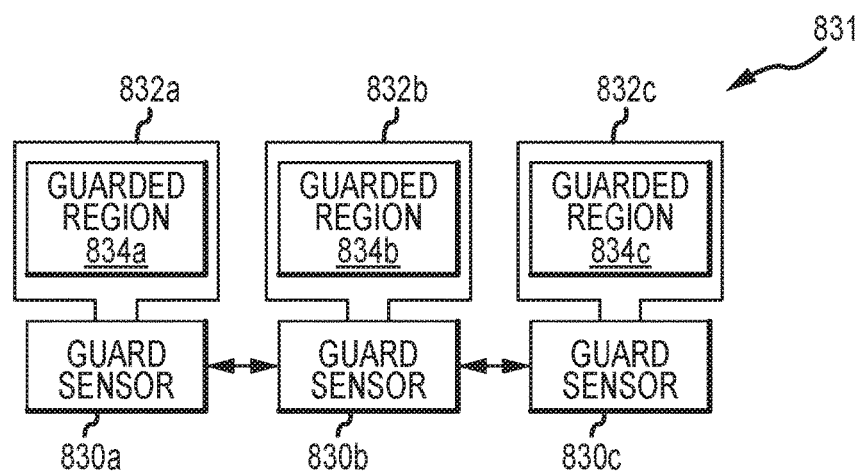

Referring now to FIGS. 8a through 8c, "a" guard sensor assembly may include a connection of multiple guard sensors included separate or shared guard signal transmission paths and high frequency guard signals configured to protect separate or common guarded regions. The individual guard sensors share information as to any detected intrusions or a lack thereof. Different guard sensors may be specifically configured to detect and characterize different types of intrusions. Different guard sensors may be specifically configured different vulnerable points of attack. Synthesis and integration of this information may enhance the overall capability as to detection sensitivity, localization or characterization of the intrusion.

As shown in FIG. 8a, a plurality of guard sensors 800 (Sensor A, Sensor B, etc.) may be configured in an arbitrary network 802 that defines a guard sensor assembly 803. This network may define one or more guarded regions. Each guarded region may be addressed by one or more guard sensors utilizing the same or different guard signal transmission path configurations or the same or different guard signal waveforms to enhance detection, localization and characterization capabilities. The network may be configured based on the target signal transmission path and target signals to be protected, environmental conditions and the nature of likely intrusions.

As shown in FIG. 8b, in a particular network a plurality of guard sensors 820a and 820b provides a guard sensor assembly 821 that defines a mesh 822 of guard signal transmission paths 824a and 824b that provide both the EM and physical barrier to intrusion of a common guarded region 826, in which the guard sensors 820a and 820b are interconnected to detect an intrusion of the common guarded region 826. The depicts an implementation in which groups of independent or cooperating guard sensors 820a and 820b and corresponding guard sensor transmission paths 824a and 824b are used to cover a region and that the guard sensor transmission paths 824a and 824b can be overlaid to provide more complete coverage. Each individual guard sensor signal can be transmitting different waveforms at different times to make successful attacks increasingly difficult and sensor coverage more complete.

As shown in FIG. 8c, in a particular network a plurality of guard sensors 830a, 830b and 830c provide a guard sensor assembly 831 that defines a network of guard signal transmission paths 832a, 832b and 832c that provide both the EM and physical barriers to intrusion of separate guarded regions 834a, 834b and 834c, in which the guard sensors 830a-830c are interconnected to share information directed to intrusion of the separate guarded regions 834a-834c. This configuration depicts cases where multiple sensors within a system are used in a cooperative manner to guard different objects as necessary to provide comprehensive protection of the system from intrusive attacks.

Figure 9:
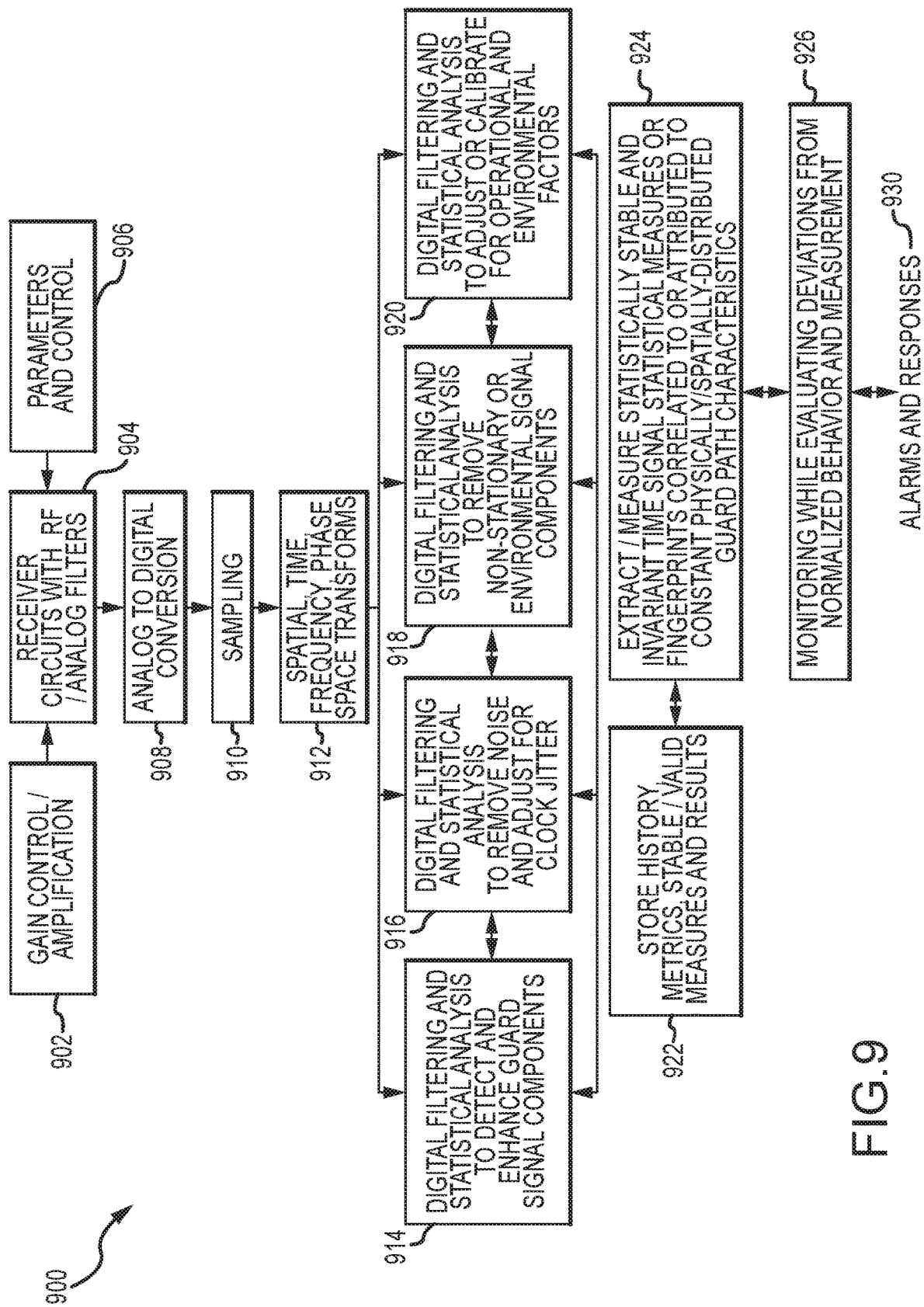
FIG. 9 is a flow diagram of an embodiment for processing one or more components of a received guard signal to detect physical or EM intrusions of the guarded regions.

Referring now to FIG. 9, an embodiment of a generalized high-level guard sensor receiver processing flow 900 includes various steps to measure and process components of the received high frequency guard signal. This flow may be more generally considered to represent the processing of the guard circuitry and operation of the guard circuitry including the components of the received high frequency guard signal and environmental data to generate and to periodically update a dynamic fingerprint of the guard circuitry and guard signal to detect intrusions of the guarded region.

The front-end receiver circuits with associated radio frequency (RF)/Analog Filters 904 are used to receive the input signal waveforms. Such receivers typically will incorporate Gain Control/Amplification 902. Additionally receivers will receive control inputs and parameters 906 to adjust the RF/analog function of the receiver including equalization settings, polarity, and others. Analog to Digital Conversion 908 and Sampling 910 is performed on the signal waveforms. Most generally Spatial, Time, Frequency, Phase Space Transforms, Hilbert, and other signal space transforms 912 can be performed based on anticipated characteristics of received waveforms.

Different mixtures of processing are required for initial characterization of the specifics corresponding to the individual guard signal transmission path physical characteristics. This process was previously referred to as "dynamic fingerprinting". Multiple types of digital signal processing and statistical signal processing processes can be used to eliminate noise and uncorrelated energy terms as well as calibrate for variations in environmental and operational circumstances. Signal components that correlate only to the fixed constant physical parameters will converge to a multivariate static signal, which is the fingerprint for the path.

These processes therefore include Digital Filtering and Statistical Analysis to Detect and Enhance Guard Signal Components 914 based on the known transmitted guard signal characteristics or else expected characteristics from previously received guard signal components. Digital filtering and statistical analysis is performed to remove noise and adjust for sources of clock jitter 916. Digital filtering and statistical analysis is likewise performed to remove non-stationary or environmental signal components 918. Digital filtering and statistical analysis is also performed to adjust or calibrate for operational and environmental factors 920. Finally, processing is performed to extract/measure the resulting statistically stable and invariant time signal statistical measures (fingerprints) correlated to or attributed to constant physically and spatially-distributed guard transmission path characteristics 924. Initially this is for calibration and over time prior times are used for machine learning to increase confidence bounds in results and more completely eliminate uncorrelated terms. Then current time measurements are for monitoring and assessment. Processing could store history, metrics, stable/valid measures and results 922 for building the necessary statistics for calibration or continued result refinement. Having baselined expected normal fingerprinting results, processing would then perform monitoring while evaluating deviations from normalized behavior and measurement 926 producing alarms and responses 930.

Figure 10A:
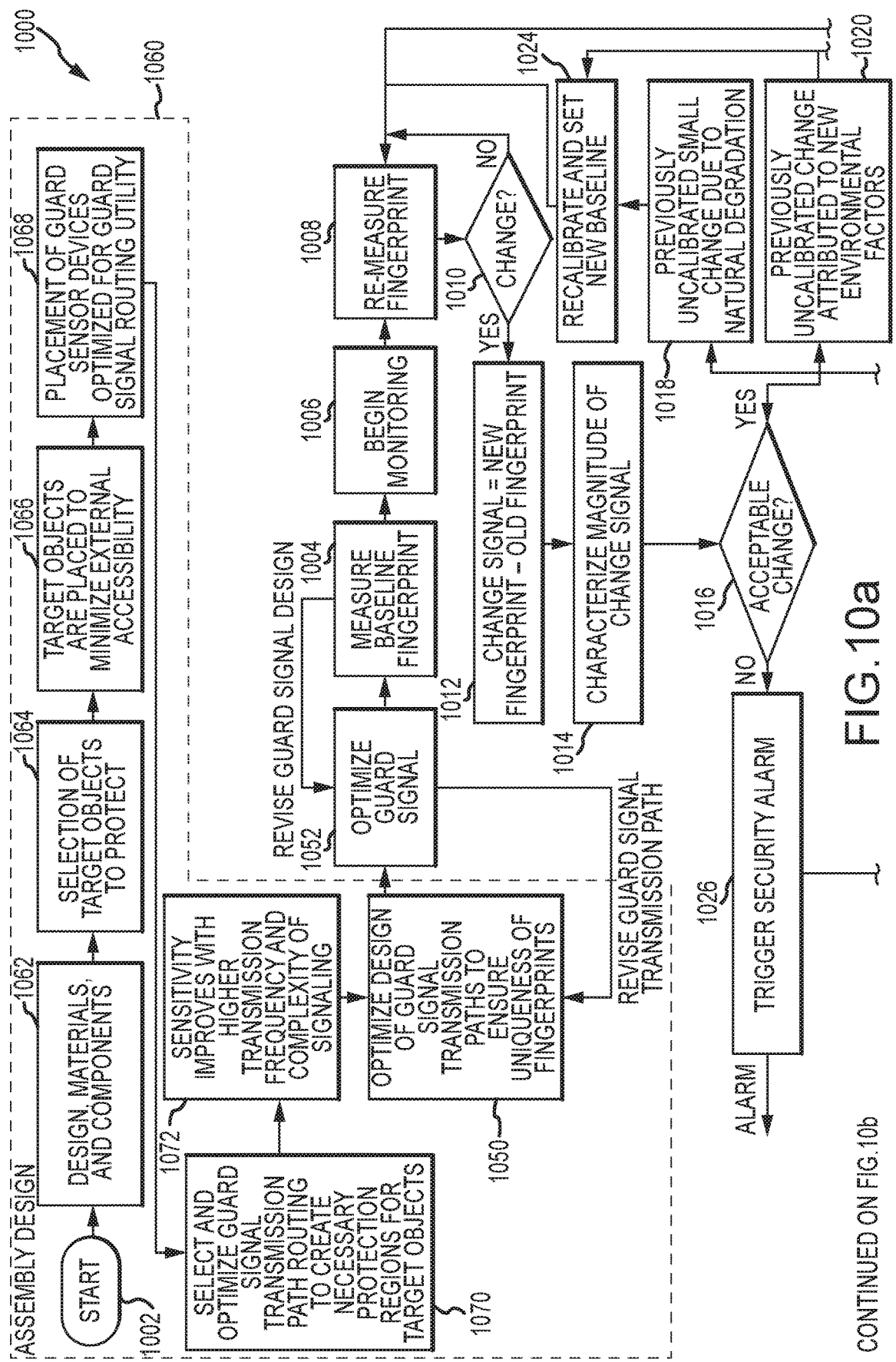
FIGS. 10a and 10b are a flow diagram of an embodiment for configuring the guard signal transmission path and guard signal and processing one or more components of a received guard signal to improve detection sensitivity, localize the intrusion and characterize the intrusion.
Figure 10B:
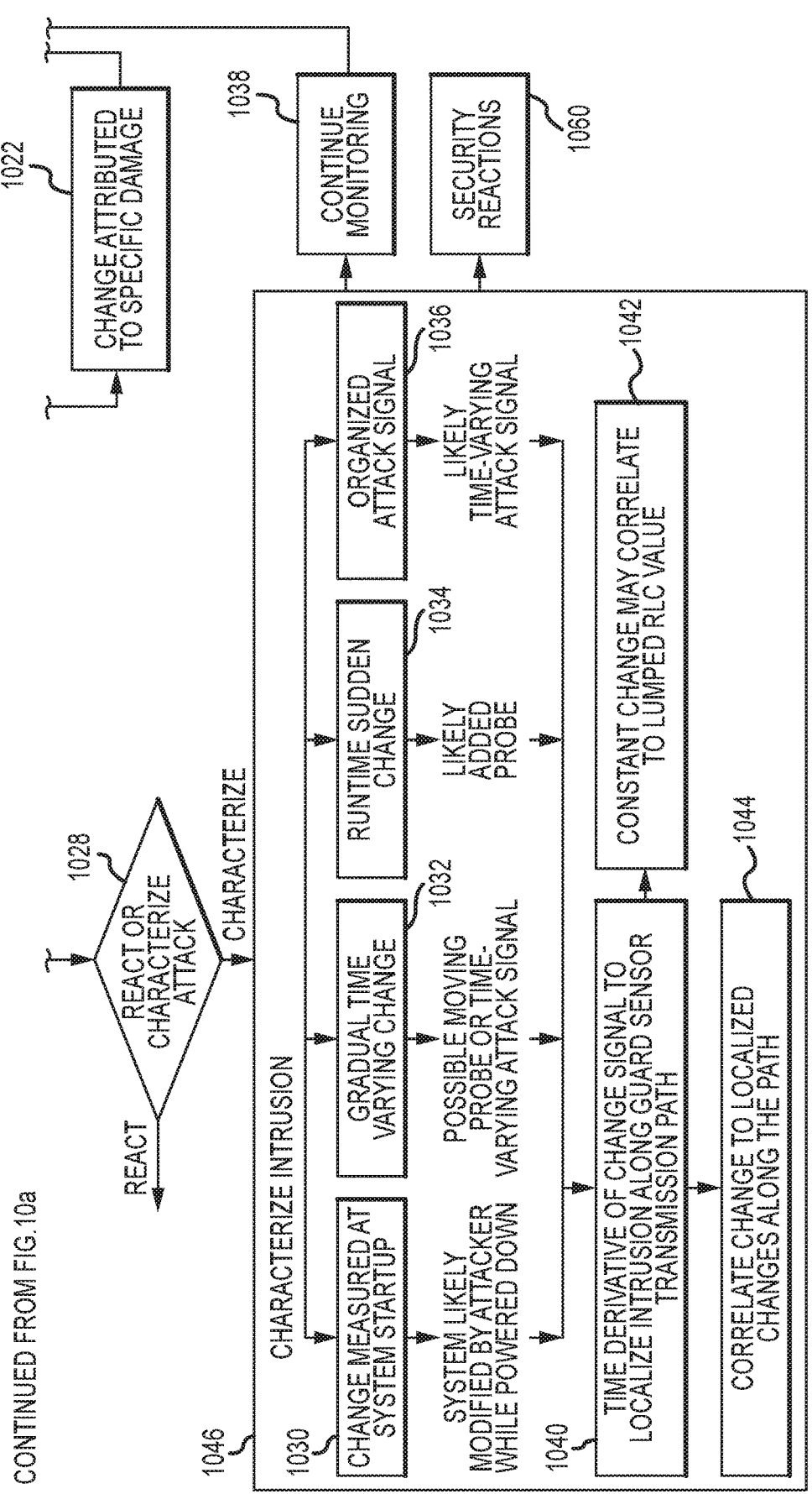

Referring now to FIGS. 10a and 10b, in different embodiments the physical configuration and parameters of the guard signal transmission path, the parameters of the high frequency guard signal and the processing of the received components of the guard signal may be tailored to improve detection sensitivity (overall or to particular intrusions), localize the intrusion and/or characterize the intrusion.

As shown in FIG. 10a the general process start 1002 begins with assembly design 1060. The assembly functional and mechanical design, materials, and components 1062 are integrated together to form the target circuitry and guard structure. As part of an overall security design for the assembly it is determined whether and what objects need to be protected from unauthorized access. Consequently, it is essential to identify vulnerabilities such as access to test interfaces or other items that could be used by an attacker to compromise the design. This leads to selection of target objects to protect 1064.

In designing the mechanical layout of the assembly, in order to minimize the physical attack surface, target objects are placed to minimize external accessibility 1066. This can involve techniques such as minimizing length of target signal paths and burying the signals into the middle of a multi-layer PCB stack-up. Placement of guard sensor devices is optimized for guard signal routing utility 1068. Ideally, placement is selected for close proximity to the regions of the design to be guarded. Considerations have to be balanced for routability of the signals, interference sources and all the other tradeoffs involved including maintaining signal integrity of the guard signals, target signals, and other nearby signals as well.

Next the optimize guard signal transmission path routings are selected and optimized to create the protection regions for target objects 1070. Once the target objects are placed or routed, this defines the regions that require protection. As described previously, this typically involved sandwiching the target objects with guard sensor transmission paths above or below or else the target objects are placed within the region where alterations directly affect the transmission characteristics of guard sensor signals.

The design of both protected objects and the guard sensor and the guard sensor transmission paths are integrated to achieve protection region coverage and to maximize effectiveness of the guard sensor optimizing sensitivity as well as ensuring uniqueness of fingerprint results. Detection sensitivity may be enhanced through selection of the materials, selection of the transmission path, integration of impedance features or creating of feature markers in the signal. Sensitivity improves with higher transmission frequency and complexity of signaling 1072. The goals for design of the guard sensor transmission path and signals are in complete opposition to the normal design paradigm for successful signaling and communication. Thus the two competing needs have to be carefully balanced; if the frequency and complexity together are too high then the sensor signal will not successfully propagate along the transmission path. More over it may be desirable to optimize the design of guard signal transmission paths to ensure uniqueness of fingerprints 1050.

Once the physical design is established, then optimization of the guard signal design 1052 occurs based on that physical design. Based on results of that design process, revisions may be made to guard signal transmission path optimization 1050. Once the assemblies are fabricated, the baseline fingerprint 1004 is measured as previously described by FIG. 9 establishing a baseline characterization (dynamic) fingerprint to use to monitor whether the system has measurably changed. As previously described, the dynamic fingerprinting process calibrates out known variations such as due to environmental circumstances. The guard signal design 1052 may be revised based on the measurement of the baseline fingerprint.

This process flow continues as sensor monitoring begins 1006 and fingerprint re-measurement occurs 1008. If change is not detected 1010, re-measurement 1008 simply continues. If change is detected 1010 a decision process analogous to the one shown is then used to determine whether there is a positive indication that an actual attack has occurred or is occurring. Statistical characterizations may be used to maximize likelihood of attack detection while limiting likelihood of false positive detections.

Measured fingerprints are complex multi-variate signals and consequently a change signal can be calculated as the difference New Fingerprint-Old Fingerprint 1012. The magnitude of the change signal is characterized 1014. A decision can be made whether the change is acceptable 1016. Acceptable changes that are too small in magnitude are most likely attributable to cases such as previously uncalibrated small change due to natural degradation 1018. Degradation typically would be associated with gradual degradation or accumulative damage to circuit components themselves. This degradation can be calibrated out of the fingerprinting process, but if not already accomplished, the sensor monitoring process could recalibrate and set new baseline 1024. Additionally, acceptable changes could be a result of the sensor measuring previously uncalibrated change that can be attributed to new environmental factors such as vibration 1020. In this case the sensor monitoring process could likewise recalibrate and set new baseline 1024. Finally, acceptable changes that occur due to circumstances such as change that can be attributed to specific damage 1022 could result in the guard sensor device being commanded to recalibrate and set new baseline 1024.

However, when characterizing the magnitude of the change signal, if the decision 1016 is that the magnitude is unacceptable, this indicates that an attack might be likely to be occurring and thus trigger a security alarm 1026. A decision process determines whether to react and trigger some action or whether to perform characterization of the change (possibly requiring additional monitoring to gather more information in the process) or both 1028.

As shown in FIG. 10*b*, he Characterize Intrusion process 1046 depicts a functional breakdown of types of processing functions that could be used to determine the nature or location of the attack process. Note also that an attack could be simply due to damage or use of the assembly in an unauthorized manner subjecting it to unanticipated stresses or manipulations. First of all, change measured at system startup 1030 would indicate manipulation to the assembly such as alterations that most likely would occur while not powered-on.

Gradual time varying change 1032 on the order of seconds or minutes could indicate a possible moving probe for instance or if much more rapid could indicate a time-varying attack signal or an unanticipated interference signal. Moreover, a runtime sudden change 1034 could indicate that a probe has just been added. Finally if the change signal has structure that is recognizable then it can be classified as an organized attack signal 1036. This likely could be attributed to a likely time-varying attack or other unauthorized or unpermitted signal interfering with the guard sensor signal. In addition to generalized categorization or results and correlation to causations, it is also possible to perform processing in order to localize where along the guard sensor signal path has occurred. One technique would be to calculate a time derivative of the change signal to localize intrusion along the guard sensor transmission path 1040. If there is no distinguishing change corresponding to transmission time along the path and the change is essentially a constant, constant change may correlate to a lumped resistance, inductance, and capacitance (RLC) value 1042. Otherwise, it may be possible to correlate change to localized changes along the path such as for added metal, capacitance, resistance, or inductance 1044.

The general process decision flow indicates that monitoring may continue 1038 gathering additional information to improve accuracy of results, minimize likelihood of false positive or negative attack detections. Various attack reactions 1060 might occur as refined threat assessment information accumulates such as sharing results with other devices or systems. Results from analysis could be used to identify specific attacks that could have occurred or are occurring. Results could be reported to other devices and correlated to other measurements or could be communicated in order to access the security of a large number of systems.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A guard sensor for protecting one or more objects in a guarded region, comprising:
   a processor;
   one or more guard signal transmission paths defining the
      guarded region and configured to provide both an electromagnetic (EM) and physical barrier to intrusion of the guarded region, said one or more guard signal transmission paths characterized by an amplitude response with a knee frequency above which the paths exhibit non-linear behavior;

a transmitter configured to transmit one or more guard signals over the one or more guard signal transmission paths, said guard signals transmitted at frequencies Y above the knee frequency and at least 4 GHz;

a receiver configured to receive components of one or more received guard signals from the one or more guard signal transmission paths; and a memory, wherein the memory has stored thereon instructions that, when executed by the processor, cause the processor to:
  generate and transmit the one or more guard signals over the one or more guard signal transmission paths;
  measure the components of the received guard signals; and
  compare the one or more components of the received guard signals to one or more previously received guard signals to detect changes in physically distributed transmission parameters of the one or more guard signal transmission paths or one or more guard signals at frequencies above the knee frequency and at least 4 GHz as a proxy for EM and physical intrusions on the guarded region.

2. The guard sensor of claim 1, further comprising circuitry including first and second circuit devices connected by the one or more guard signal transmission paths that carry the one or more guard signals and one or more target signals, wherein at least a portion said one or more guard signal transmission paths and the one or more target signals constitute objects that lie within the guarded region.

3. The guard sensor of claim 2, wherein the knee frequency is at least 4 GHz.

4. The guard sensor of claim 1, further comprising circuitry including first and second circuit devices connected by one or more target signal transmission paths configured to carry one or more target signals at frequencies X where a ratio of Y/X is at least 5, wherein at least a portion said one or more target signal transmission paths and the one or more target signals constitute objects that lie within the guarded region.

5. The guard sensor of claim 4, wherein X is less than 1 GHz and the knee frequency is at least 4 GHz.

6. The guard sensor of claim 4, further comprising a multi-layer printed circuit board (PCB), wherein the one or more target signal transmission paths comprise single-ended traces, wherein the one or more guard signal transmission paths comprise differential transmission lines.

7. The guard sensor of claim 6, wherein the multi-layer PCB comprises first and second power planes positioned between different layers of the PCB, wherein at least a portion of one of the single-ended traces is routed through a layer between the first and second power planes, wherein at least a portion of one of the differential transmission lines is routed above and below the first and second power planes to define the guarded region that encompasses the portion of the single-ended trace between the first and second power planes.

8. The guard sensor of claim 4, wherein the circuitry further includes one or more target signal transmission paths configured to carry target signals at frequencies Z of at least 4 GHz where a ratio of Z/X is at least 5 between said first and second circuit devices, wherein the memory has stored thereon instructions that, when executed by the processor, cause the process to:
  periodically measure physical characteristic data of the circuitry, operational data of the circuitry, and environmental data related to at least the one or more target signal transmission paths and target signals;
  periodically capture the measured data;
  generate a dynamic fingerprint based on an aggregation of a portion of the captured data, wherein the dynamic fingerprint is a compound data structure encapsulating the aggregated data;
  associate metadata with the dynamic fingerprint;
  periodically update the dynamic fingerprint according to successive sets of the captured data; and
  compare the updated dynamic fingerprint to a previous dynamic fingerprint, to detect the changes in the dynamic fingerprint as a proxy for EM and physical intrusions on the circuitry.

9. The guard sensor of claim 4, further comprising one or more target signal transmission paths configured to carry target signals at frequencies Z of at least 4 GHz where a ratio of Z/X is at least 5, wherein the transmitter is configured to transmit at least one said guard signal over the one or more target signal transmission paths.

10. The guard sensor of claim 1, wherein the knee frequency is at least 4 GHz, further comprising circuitry included first and second circuit devices connected by one or more target signal transmission paths configured to carry one or more target signals at frequencies Z of at least 4 GHz, wherein at least a portion said one or more target signal transmission paths and the one or more target signals constitute objects that lie within the guarded region.

11. The guard sensor of claim 10, wherein the memory has stored thereon instructions that, when executed by the processor, cause the processor to:
  periodically measure physical characteristic data of the circuitry, operational data of the circuitry, and environmental data related to at least the one or more target signal transmission paths and target signals;
  periodically capture the measured data;
  generate a dynamic fingerprint based on an aggregation of a first set of the captured data, wherein the dynamic fingerprint is a compound data structure encapsulating the aggregated data;
associate metadata with the dynamic fingerprint;
  periodically update the dynamic fingerprint according to successive sets of the captured data; and
  compare the updated dynamic fingerprint to a previous dynamic fingerprint, to detect the changes in the dynamic fingerprint as a proxy for EM and physical intrusions on the circuitry within the guarded region.

12. The guard sensor of claim 1, further comprising first and second circuit assemblies each having a first connector that is physically connected to a common interconnect, at least one said guard sensor residing at least one of said first and second circuit assemblies with said one or more guard signal transmission paths routed through the first connectors on each of said first and second circuit assemblies and the common interconnect such that the physical connectivity of the first and second circuit assemblies constitutes an object in the guarded region.

13. The guard sensor of claim 1, wherein the objects in the guarded region comprise at least one of circuit devices, signal paths or signals.

14. The guard sensor of claim 1, wherein the transmitter and receiver are co-located in a common circuit device.

15. The guard sensor of claim 1, wherein the transmitter and receiver are located on separate circuit devices.

16. The guard sensor of claim 1, wherein a plurality of guard sensors provide a guard sensor assembly that defines a mesh of guard signal transmission paths that provide both the EM and physical barrier to intrusion of a common guarded region, wherein said guard sensors are interconnected to detect an intrusion of the common guarded region.

17. The guard sensor of claim 16, wherein at least first and second guard sensor transmit different waveforms as the guard signals over the mesh.

18. The guard sensor of claim 1, wherein a plurality of guard sensors provide a guard sensor assembly that defines a network of guard signal transmission paths that provide both the EM and physical barriers to intrusion of separate guarded regions, wherein said guard sensors are interconnected to share information directed to intrusion of the separate guarded regions.

19. The guard sensor of claim 1, wherein the instructions stored in memory cause the processor to detects and identifies intrusions including physical modifications to the objects or the guard signal transmission paths or insertions of a physical probe or signal into the guarded region.

20. The guard sensor of claim 1, wherein the one or more guard signals are digitally modulated analog signals, wherein comparison of the one or more components of the one or more guard signals produces a bit error rate (BER) that is compared to a nominal BER to detect an intrusion.

21. The guard sensor of claim 1, wherein the one or more guard signals are digitally modulated analog signals that exhibit an eye pattern, wherein processing the one or more components of the received one or more guard signals extracts analog parameters of the eye pattern and processes changes to those analog parameters to detect an intrusion.

22. The guard sensor of claim 1, wherein the one or more guard signal transmission paths are configured by selection of materials and routing and the one or more guard signals are configured by selection of frequency content and modulation techniques to improve detection sensitivity of intrusions.

23. The guard sensor of claim 1, wherein instructions stored in memory cause the processor to process the components of the received guard signal into to extract and correlate features to transmission path delay to locate the intrusion of the guarded region.

24. The guard sensor of claim 1, instructions stored in memory cause the processor to process the components of the received guard signal to identify changes at start-up, gradual time varying changes, sudden runtime changes and organized attack to characterize the intrusion.

25. The guard sensor of claim 1, wherein at least one of the guard signal transmission paths includes an antenna structure.

26. The guard sensor of claim 1, a memory, wherein the memory has stored thereon instructions that, when executed by the processor, cause the processor to:
    periodically measure physical characteristic data of the one or more guard signal transmission paths, operational data of the one or more guard signal transmission paths including the one or more received guard signals, and environmental data related to at least the one or more guard signal transmission paths and guard signals;
    periodically capture the measured data;
    generate a dynamic fingerprint based on an aggregation of a first set of the captured data, wherein the dynamic fingerprint is a compound data structure encapsulating the aggregated data;
    associate metadata with the dynamic fingerprint;
    periodically update the dynamic fingerprint according to successive sets of the captured data; and
    compare the updated dynamic fingerprint to a previous dynamic fingerprint, to detect the changes in the dynamic fingerprint as a proxy for EM and physical intrusions on the guarded region.

27. A guard sensor, comprising:
    circuitry including first and second circuit devices connected by one or more target signal transmission paths configured to carry one or more target signals at frequencies less than 1 GHz;
    a processor;
    one or more guard signal transmission paths configured to provide both an electromagnetic (EM) and physical barrier to intrusion of a guarded region that encompasses at least a portion of the one or more target signal transmission paths and the one or more target signals, said one or more guard signal transmission paths characterized by an amplitude response with a knee frequency of at least 4 GHz above which the guard signal transmission paths exhibit non-linear behavior;
    a transmitter configured to transmit one or more guard signals over the one or more guard signal transmission paths, said guard signals transmitted at frequencies above the knee frequency;
    a receiver configured to receive components of one or more received guard signals from the one or more guard signal transmission paths;
    and
    a memory, wherein the memory has stored thereon instructions that, when executed by the processor, cause the processor to:
        generate and transmit the one or more guard signals over the one or more guard signal transmission paths;
        measure the components of one or more received guard signals; and
        compare the one or more components of the received guard signals to one or more previously received guard signals to detect changes in physically distributed transmission parameters of the one or more guard signal transmission paths or one or more guard signals at frequencies above the knee frequency as a proxy for EM and physical intrusions on the guarded region.

28. A guard sensor, comprising:
    first and second circuit assemblies each having a first connector that is physically connected to a common interconnect;
    a processor;
    one or more guard signal transmission paths routed through the first connectors on each of the first and second circuit assemblies and the common interconnect to provide both an electromagnetic (EM) and physical barrier to intrusion of a guarded region that encompasses the physical connectivity of the first and second assemblies, said one or more guard signal transmission paths characterized by an amplitude response with a knee frequency of at least 4 GHz above which the guard signal transmission paths exhibit non-linear behavior;

a transmitter configured to transmit one or more guard signals over the one or more guard signal transmission paths, said guard signals transmitted at frequencies above the knee frequency;

a receiver configured to receive components of one or more received guard signals from the one or more guard signal transmission paths;

and a memory, wherein the memory has stored thereon instructions that, when executed by the processor, cause the processor to:

generate and transmit the one or more guard signals over the one or more guard signal transmission paths;

measure the components of one or more received guard signals; and compare the one or more components of the received guard signals to one or more previously received guard signals to detect changes in physically distributed transmission parameters of the one or more guard signal transmission paths or one or more guard signals at frequencies above the knee frequency as a proxy for EM and physical intrusions on the guarded region that effect the physical connectivity of the first and second assemblies.

* * * * *

UNITED STATES PATENT AND TRADEMARK OFFICE
CERTIFICATE OF CORRECTION

PATENT NO. : 10,938,841 B2
APPLICATION NO. : 16/166668
DATED : March 2, 2021
INVENTOR(S) : Jennings et al.

Page 1 of 1

It is certified that error appears in the above-identified patent and that said Letters Patent is hereby corrected as shown below:

In the Claims

In Column 19, Line 12, in Claim 1, after "paths;", delete a linebreak

In Column 22, Line 34, in Claim 27, after "paths;", delete a linebreak

In Column 23, Line 7, in Claim 28, after "paths;", delete a linebreak

Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*